United States Patent [19]
Keefer

[11] Patent Number: 4,702,903
[45] Date of Patent: Oct. 27, 1987

[54] METHOD AND APPARATUS FOR GAS SEPARATION AND SYNTHESIS

[76] Inventor: Bowie G. Keefer, 4324 West 11th Avenue, Vancouver, British Columbia, Canada, V6R 2M1

[21] Appl. No.: 866,395

[22] Filed: May 23, 1986

Related U.S. Application Data

[63] Continuation-in-part of Ser. No. 538,370, Oct. 3, 1983, abandoned.

[51] Int. Cl.⁴ .................... C01C 1/04; B01D 53/04
[52] U.S. Cl. .................... 423/359; 55/28; 55/68; 55/160; 55/208; 60/649; 60/673; 252/373; 422/148; 422/169; 422/187; 422/217; 423/362; 423/652; 423/653; 423/659; 518/722
[58] Field of Search .................... 60/649, 673; 518/722; 423/359, 362, 652, 653, 659; 422/148, 169, 211, 187, 212, 217, 222; 55/28, 62, 55, 58, 59, 189, 195, 208

[56] References Cited

U.S. PATENT DOCUMENTS

| | | | |
|---|---|---|---|
| 3,141,748 | 7/1964 | Hoke et al. | 55/58 |
| 3,149,934 | 9/1964 | Martin | 55/58 |
| 3,323,288 | 6/1967 | Cheung et al. | 55/58 |
| 3,370,420 | 2/1968 | Johnson | 60/649 |
| 3,504,494 | 4/1970 | Winsche | 60/649 |
| 3,568,438 | 3/1971 | Meienberg | 60/673 |
| 3,838,553 | 10/1974 | Doherty | 55/58 |
| 3,871,179 | 3/1975 | Bland | 60/649 |
| 4,070,164 | 1/1978 | Miwa et al. | 55/58 |
| 4,161,210 | 7/1979 | Reid et al. | 60/673 |
| 4,198,827 | 4/1980 | Terry et al. | 60/649 |
| 4,280,824 | 7/1981 | Lassmann et al. | 55/58 |
| 4,340,398 | 7/1982 | Doshi et al. | 55/58 |
| 4,359,328 | 11/1982 | Wilson | 55/58 |

Primary Examiner—John Doll
Assistant Examiner—Wayne A. Langel
Attorney, Agent, or Firm—Carver & Co.

[57] ABSTRACT

Pressure swing adsorption gas separations are conducted inside an open loop Stirling cycle apparatus which may operate as an engine, refrigerator or heat pump. Adsorbent surfaces are associated with the thermal regenerators of the Stirling cycle apparatus, so that a preferentially adsorbed gas fraction is concentrated by parametric pumping into a colder end of an engine or into a warmer end of a refrigerator or heat pump, while a less readily adsorbed gas fraction is concentrated into warmer end of an engine or into colder end of a refrigerator or heat pump. Flow control means are provided to introduce the feed gas into the working space of the apparatus and to remove separated product fractions. Feed gases may be chemically reactive within a portion of the working space, with reactant and product species of the reaction separated by the apparatus to drive the reaction off equilibrium. Engine embodiments of the invention may then convert the heat of an exothermic reaction to mechanical power, while heat pump embodiments may supply heat to an endothermic reaction.

54 Claims, 8 Drawing Figures

METHOD AND APPARATUS FOR GAS SEPARATION AND SYNTHESIS

CROSS REFERENCES TO RELATED APPLICATIONS

This is a continuation-in-part of my co-pending application, Ser. No. 06/538,370 filed Oct. 3, 1983 now abandoned.

BACKGROUND OF THE INVENTION

1. Field of the Invention

The invention relates generally to separations and catalytic chemical reactions conducted in the gas or vapour phase. Some particular applications include gas already compressed and preheated oxygen for combustion, natural gas purification and compression, hydrogen isotope separation, ammonia or methanol synthesis, and steam reforming of methane.

2. Prior Art

Gas separation by pressure swing adsorption is achieved by cyclic flow of a gas mixture over an adsorbent bed which more readily adsorbs a fraction of the mixture. The term "swings" refers to periodic variations of pressure. The total pressure, ie, sum of partial pressures of the gases, is elevated during intervals of flow in a first direction and is reduced during alternating intervals of flow in the reverse direction. According to the well known parametric pumping separation principle, the less readily adsorbed fraction tends to migrate in the first direction over complete cycles while the more readily adsorbed fraction tends to migrate in the reverse direction.

The conventional process for gas separation by pressure swing adsorption uses two or more adsorbent beds with directional valving to control the flow of compressed feed gas over each bed in alternating sequence, while the other bed is purged at low pressure by the reverse flow of a portion of the product gas. This conventional process makes inefficient use of mechanical energy, because the compression energy of the feed gas is largely dissipated over the valves. Another common name for pressure swing adsorption gas separation is "heatless adsorption", which seems to deny the possibility of a beneficial effect by thermal coupling to heat sources or heat sinks to improve pressure swing adsorption apparatus as disclosed in the present invention.

Conventional gas separation processes (including pressure swing adsorption, cryogenic distillation and membrane permeation) are powered by mechanical energy. The energy intensiveness of air separation is a major obstacle to widen use of enriched oxygen in high temperature processes such as solid fuel gasification. An efficient air separation process powered by waste heat would address this need.

Some secondary and adverse thermal effects do arise in operation of conventional pressure swing adsorption gas separation apparatus, particularly those using large adsorption beds with poor heat exchange to ambient. The adverse effects include cyclic release and take-up of the latent heat of adsorption which causes a temperature swing of the adsorbent bed which acts in opposition to the pressure swing. Adsorption is increased by higher pressure and/or reduced temperature, and conversely is decreased by lower pressure and/or higher temperatures.

Examples of single bed pressure swing adsorption devices are found in U.S. Pat. No. 3,121,625 (Broughton), U.S. Pat. No. 3,164,454 (Wilson), U.S. Pat. No. 3,236,028 (Rutan), U.S. Pat. No. 4,169,715 (Eriksson), U.S. Pat. No. 4,194,892 (Jones et al), U.S. Pat. No. 4,207,084 (Gardner), and U.S. Pat. No. 4,354,859 (Keller et al). Most of the above references use mechanical volume displacement means at one or both ends of the adsorbent bed to generate cyclic flow and pressure variations in the bed. The Keller patent uses mechanical volume displacement means at both ends of the adsorbent bed, with a specified range of phase angles between the two volume displacement means of unequal displacement. None of these references contemplates the integral coupling of a pressure swing adsorption process with a regenerative thermal power or heat pump cycle as in the present invention.

A temperature swing adsorption separation process known as "recuperative parametric pumping" was described by Wilhelm (R. H. Wilhelm, A. W. Rice and A. R. Bendelius, Ind. Eng. Chem. Fundamentals 5, 141, (1966) with applications to liquid phase separation. A fluid mixture was made to flow cyclically in forward and reverse directions in an adsorbent bed with an imposed thermal gradient between hot and cold ends. The heat capacity of the fluid mixture was large with respect to the heat capacity of the adsorbent material, in order to obtain thermal cycling of each adsorbent pellet.

The present invention can be considered as subjecting a flow of a gas mixture to a Stirling cycle or other thermodynamic regenerative cycle which has been changed to operate as an *open cycle* to perform thermally coupled pressure swing adsorption separations. This contrasts with a conventional Stirling cycle machine which has a *closed* working volume filled with a gaseous working fluid. The working volume includes hot and cold spaces, whose volume is varied by mechanical volume displacement means reciprocating out of phase. A thermal regenerator is in the flow path connecting the hot and cold spaces. In a conventional Stirling machine heat capacity of the working fluid is desirably very low with respect to the heat capacity of the regenerator materials so that the temperature swing at each point of the regenerator will be minimal. This temperature swing of the regenerator results in non-isothermal conditions in the regenerator and is an unavoidable source of inefficiency in conventional Stirling type machine.

The out of phase reciprocation of the volume displacement means causes cyclic flow of the working fluid through the regenerator. Cyclic pressure variations are associated with alternative heating or cooling of gas flowing respectively into the hot or cold spaces, and with variations of total working volume. If volume changes in the hot space have a leading phase with respect to volume changes in the cold space, the Stirling machine is an engine. Conversely, the Stirling machine is a heat pump or refrigerator when volume changes in the hot space lag volume changes in the cold space. Related machines include thermocompressors, Vuilleumier thermally powered refrigeration machines, and Gifford-McMahon pressure powered refrigeration machines.

In Stirling type machines operated as cryogenic refrigerators, performance deteriorates at very low temperatures where the heat capacity of regenerator materials ceases to be very large relative to the heat capacity of the helium gas working fluid. As disclosed in U.S. Pat. No. 3,262,277 (Nesbitt), a solid adsorbent material can improve performance of thermal regenerators operating below 20 degrees K., as the effective heat capacity is increased by the presence of adsorbed helium in the regenerator material. Under the steady state operating conditions envisaged by Nesbitt, the adsorbed helium phase is essentially static, contrary to the requirements of a gas separation or purification process. Significant rates of cyclic adsorption and desorption would entail corresponding release and take-up of a latent heat of adsorption, degrading regenerator thermal performance in a Stirling type refrigerator. Successful operation of the Nesbitt patent depends on suppression of cyclic pressure swing adsorption and desorption through substantial cancellation by opposing temperature swing effects over the adsorbent in the regenerator, and probably also through capillary condensation of liquid helium in adsorbent pores which causes known pressure hysteresis effects inhibiting desorption from pores filled with liquid adsorbate. High speed operation may also tend to suppress cyclic adsorption and desorption.

Use of rapidly dissociating gases such as nitrogen tetroxide as working fluid in Brayton and Stirling closed cycle engines is proposed in U.S. Pat. No. 3,370,420 (Johnson). The dissociation/recombination reaction increases gas volume in the hot space and thus improves engine work ratio. Use of a catalyst in the regenerator of a Stirling engine using a dissociated gas working fluid has been proposed in U.S. Pat. No. 3,871,179 (Bland) with the object of obtaining enhanced reaction rates in closed cycle Stirling engines with high work ratio. In these inventions, the forward reaction is exactly cancelled by the reverse reaction over each cycle because reaction products are trapped in the engine spaces. As there is no means to drive the reaction off equilibrium, these inventions cannot be applied to chemical synthesis processes. Therefore it has not hitherto been possible to apply the closed Stirling cycle to recover heat from exothermic chemical synthesis reactions, or to supply heat for endothermic reactions, while using the reacting gases as the Stirling machine working fluid.

Fundamental problems in chemical process industry include the removal of reaction product species and exothermic reaction heat from catalyst beds. High temperatures promote good reaction rates, but shift the equilibrium of an exothermic reaction toward lower conversion. These problems and their conventional solutions are exemplified by the important chemical process of ammonia synthesis, which proceeds by the exothermic reaction:

$$3H_2 + N_2 \rightleftharpoons 2NH_3$$

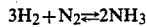

This reaction takes place over a promoted iron catalyst at a typical pressure of 200 atmospheres and a typical temperature of 750 degrees K. The hydrogen and nitrogen feed gases are stringently purified (apart from minor amounts of "inert" gases such as argon and methane, which are non-reactive in the ammonia synthesis loop, and are compressed to the high working pressure. In order to remove the product and thus drive the synthesis reaction over the catalyst bed off equilibrium, the gas mixture of reagents and produced ammonia is recirculated between the hot catalyst bed and a cool ammonia separator/condenser. This recirculation requires a recycle compressor and a recuperative heat exchanger. To prevent excessive catalyst heating from the exothermic reaction, temperature control is achieved either by energy inefficient quenching by injection of cool feed gas, or by heat exchange to an external waste heat recovery power cycle. A Brayton cycle gas turbine heat recovery approach for ammonia synthesis is disclosed in U.S. Pat. No. 4,224,299 (Barber et al) and U.S. Pat. No. 4,273,743 (Barber et al). Unless the synthesis loop operates at very high pressure, a refrigeration plant is needed to condense liquid ammonia at the cool end of the synthesis loop. Means are provided for purging accumulated inerts from the loop, and valuable hydrogen from the purge gas.

Considerable research attention has been devoted to improving productivity or selectivity of catalytic chemical reactors through cyclic operation forced by periodic variation of feed composition or temperature cycling. For example, it was found by (A. K. Jain, Ph.D. Thesis, University of Waterloo Ontario) that forced feed composition cycling at periods of several minutes improved the productivity of the ammonia synthesis reaction. However operation of the ethylene hydrogenation reaction over a nickel catalyst with pulsating pressure and flow was tested by Baiker et al (A. Baiker and W. Richarz, Chem. Ing. Tech 48, 1203, (1976)), who found that catalyst productivity was reduced relative to steady state operation. While it has been shown that in many cases cyclic operation can improve reaction productivity or selectivity under laboratory conditions, there remains a need for full scale reactors capable of beneficially exploiting a wide range of periodic phenomena which may be based on cyclic composition, temperature, flow or pressure variations.

Chromatographic effects have been found to enable some catalytic reactions to be driven beyond normal equilibrium constraints, when the reverse reaction is suppressed by opposite separation of products species as pulses of a feed reactant migrate through a catalyst bed in the presence of a continuously flowing carrier gas, which may be a second reactant. Chromatographic reactors are disclosed in U.S. Pat. No. 2,976,132 (Dinwiddie and Morgan) and in Canadian Pat. No. 631,882 (Magee). It was found by Unger and Rinker (B. Unger and R. Rinker, Ind. Eng. Chem., Fundam; 15, 226 (1976)) that ammonia synthesis could be conducted to high conversions beyond equilibrium at relatively low pressure by pulsing nitrogen, with hydrogen as the carrier, through a packed bed of catalyst mixed with adsorbent. These chromatographic reactors have severe limitations, including low catalyst productivity because of the interval between feed pulses, and the mixing of dilute product species in the carrier gas.

Closed cycle Stirling machines have been developed strictly as devices for conversion between thermal and mechanical forms of energy. The complex internal regime in which pressure, temperature and velocity vary continuously with time and location in Stirling machines has not previously been found useful for gas separations or chemical synthesis between components of the working fluid as taught in the present invention.

SUMMARY OF THE INVENTION

The invention reduces the difficulties and disadvantages of the prior art by providing a process and apparatus for gas separation, and also for gas phase chemical reactions which improves the yield of such reactions and simultaneously can also reduce energy consumption and complexity of such prior art processes. Furthermore, the invention utilizes a relatively simple apparatus in which mechanical valving for gas flow, heat transfer processes, and throttling of high pressure gases to low pressure are reduced considerably, thus simplifying construction and maintenance of such plants. Furthermore, the invention utilizes the well known Stirling cycle, or a similar regenerative thermodynamic cycle, for use with these gas separations and synthesis, which has been found to provide desirable flow and pressure characteristics over an adsorbent bed. Furthermore the invention utilizes the temperature gradient found in a Stirling cycle machine to enhance gas separations.

The invention may be considered as modifying a gas separation process using pressure swings over an adsorbent bed, which has been modified by superimposing on the bed a thermal regenerator subjected to a temperature gradient or thermal gradient from a Stirling cycle machine. Alternatively, the process may be considered as modifying an existing Stirling cycle machine by providing, in cooperation with the thermal regenerator of the Stirling cycle machine, an adsorbent bed which adsorbs one or more of the gas components within the Stirling cycle, which has been further modified to incorporate inlet and outlet means to admit and to exhaust gas from the normally closed Stirling cycle.

A process according to the invention is for separating components of a gas mixture containing a first component which is more readily adsorbed and a second component which is less readily adsorbed by an adsorbent material. The process includes the steps of introducing the gas mixture into a working volume having a flow path containing the adsorbent material within an adsorbent bed, and cyclically reversing direction of flow of the gas mixture along the flow path so that direction of the flow alternates between opposite ends of the flow path. The process includes cyclically varying the total pressure of the gas mixture between upper and lower pressure limits within the working volume, and simultaneously coordinating the phase relationship between the cyclic pressure variations and the cyclic flow reversals relative to the adsorbent bed such that the first component is preferentially adsorbed and immobilized by increased pressure on the adsorbent bed when the gas flows in one direction, and the first component is preferentially desorbed when the pressure is decreased and the flow is reversed. The process includes removing from adjacent one end of the adsorbent bed a first gas fraction enriched in the first component, and removing from adjacent the opposite end of the adsorbent bed a second gas fraction depleted in the first component. The process of the invention is characterized by providing in the flow path a thermal regenerator to cooperate with the adsorbent bed to produce an adsorbent/regenerator combination and also providing first and second spaces disposed adjacent opposite ends of the regenerator combination. The spaces are at different temperatures to expose the combination bed to a thermal gradient. The process also includes passing through the regenerator combination and the first and second spaces the flow which passes along the flow path so as to subject the gas flow to cyclical reversals of temperature together with cyclical reversals of pressure and direction flow, so as to facilitate separation of the gas into the first and second fraction, while also achieving conversion between thermal energy and compression energy.

The apparatus according to the invention is for separating components of the aforesaid gas mixture and includes a body having an internal working volume having first and second spaces, a flow path inter-connecting the first and second spaces and an adsorbent bed containing the adsorbent material provided in the flow path between the spaces. The apparatus has inlet means to admit gas mixture into the working volume, outlet means to discharge gas from opposite ends of the adsorbent bed, and volume displacement means associated with the first and second spaces. Reciprocating means cooperate with the volume displacement means to produce cyclic variations in total pressure and cyclic reversals in direction of flow of the gas. The reciprocating means determine a phase relationship between the cyclic variations of pressure in the gas and the flow directions of the gas over the adsorbent bed, so that flow under decreased pressure past the adsorbent bed towards one end of the flow path is enriched in the first more readily adsorbed component, while reverse flow under increased pressure past the adsorbent bed towards the opposite end of the flow path is depleted in the first more readily adsorbed component. The apparatus is further characterized by a thermal regenerator cooperating with the adsorbent to produce an adsorbent/regenerator combination and being provided in the flow path between the spaces to receive flow which passes along the flow path. The spaces are at different temperatures to expose the regenerator combination to a thermal gradient, so as to subject the gas flow to cyclical reversals of temperature, together with cyclical reversals of pressure and direction of flow, so as to facilitate separation into the aforesaid first and second fractions.

The process according to the invention also relates to operating a modified Stirling cycle machine wherein an internal working volume containing a gas has a flow path containing first and second spaces and a thermal regenerator is disposed between the spaces. The first and second spaces are at different temperatures to expose the regenerator to a temperature gradient. The process also includes cyclically reversing direction of flow of the gas along the flow path so that the direction of flow alternates between opposite ends of the flow path. The process also includes cyclically varying pressure of the gas between upper and lower pressure limits within the working volume so that a phase relationship exists between the cyclic pressure variations and the cyclic flow reversals relative to the thermal generator. The process is characterized by providing between the spaces an adsorbent bed containing adsorbent material to cooperate with the thermal regenerator to produce an adsorbent/regenerator combination. The process also includes introducing into the working volume a gas mixture containing a first component which is more readily adsorbed by the adsorbent material, and a second component which is less readily adsorbed by the adsorbent material. Simultaneously, when coordinating the phase relationship between the cyclic pressure variations and the cyclic flow reversals relative to the regenerator combination, preferentially adsorbing and immobilising the first component on the adsorbent material by increased pressure when the gas flows in one direction, and preferentially desorbing the first component by reducing the pressure when the flow direction is reversed. The process includes removing from one end of the regenerator combination a first gas fraction enriched in the first component and removing from the opposite end of the regenerator combination a second gas fraction depleted in the first component.

An apparatus according to the invention resembles a modified Stirling cycle machine and includes a body having an internal working volume having first and second spaces, a flow path for gas inter-connecting the first and second spaces and a thermal regenerator provided in the flow path between the first and second spaces. The first and second spaces are at different temperatures to expose the regenerator to a thermal gradient, and the and the apparatus includes first and second volume displacement means communicating with the first and second spaces respectively. Reciprocating means cooperate with the first and second volume displacement means so that the first and second volume displacement means reciprocate at the same frequency to produce cyclic variations in total pressure and in direction of flow of the gas. The reciprocating means determine the phase angle between the cyclic variations of pressure in the gas and the flow directions of the gas over the regenerator. The apparatus is characterized by an adsorbent bed containing adsorbent material cooperating with the thermal regenerator to produce an adsorbent/regenerator combination disposed between the first and second spaces. Also the gas is a gas mixture containing a first component which is more readily adsorbable and a second component which is less readily adsorbable by the adsorbent material. The apparatus includes inlet means to admit the gas mixture into the working volume and outlet means to discharge gas from opposite end of the regenerator combination. The reciprocating means subject the gas flow to cyclical reversals of pressure and direction of flow so that flow under decreased pressure of a first gas fraction past the regenerator combination towards one end of the flow path is enriched in the first more readily adsorbed component, and can be discharged therefrom through one outlet means. Also flow under increased pressure of a second gas fraction past the regenerator combination towards the opposite end of the path is depleted in the first more readily adsorbed component, and the second gas fraction can be discharged from the flow path through the remaining outlet means.

From the above it can be seen that the invention achieves direct coupling of a gas phase separation process to the Stirling cycle or a similar regenerative thermodynamic cycle which utilises a thermal regenerator exposed to a thermal gradient. Gas separations are achieved substantially by a pressure swing adsorption over an adsorption bed, which may be described as a dual function adsorbent/regenerator combination. In the specification the term "regenerator combination" refers also to this adsorbent/regenerator combination as described. The dual function adsorbent/regenerator combination has analogous storage functions for both the preferentially adsorbed gas components and heat of compression locally generated within the regenerator void spaces by cyclic pressure swings.

Gas enriched in more readily adsorbed gas component(s) and heat at one temperature are delivered at one end of the regenerator combination, while gas enriched in less readily adsorbed component(s) is delivered to the other end of the regenerator combination which accepts heat at another temperature. Net transport of heat and the more readily adsorbed gas components are in the same direction, while less readily adsorbed gas component(s) are transported in a reverse direction. Some conversion between heat and mechanical or compression energy is achieved.

The Stirling type machine of the present invention can operate either as a thermally powered engine, or as a heat pump or refrigerator. When operating as an engine it may deliver useful mechanical or compression work in addition to performing a gas separation. When operating as a heat pump or refrigerator, it may perform useful heating or cooling functions in addition to the gas separation function.

As stated previously, in the conventional Stirling engine there is an unavoidable source of inefficiency due to non-isothermal conditions at each point of the thermal regenerator. This results in temperature swings of the conventional thermal regenerator which are reduced or eliminated in the engine embodiment of the present invention where the heat of adsorption released, (or heat of desorption taken up,) contributes to more nearly isothermal conditions at each point in the regenerator bed. This is because cyclic heat generation will oppose the normal temperature swing that would arise in conventional Stirling engine regenerators. This is a unique advantage of the invention in the engine embodiment, but in the heat pump and refrigerator embodiment this advantage is not found, and steps are taken to reduce undesirable temperature swings in these other embodiments.

The present invention also applies to gas phase reactions, many of which are enhanced by use of a catalyst. In the case of an exothermic reaction, the heat of reaction assists in driving the Stirling engine internally. Alternatively enough heat may be supplied to a Stirling engine to drive both the engine and the reaction. In the case of an endothermic reaction, the Stirling heat pump would supply the heat of reaction internally. In some instances, when using a catalyst, catalyst productivity is enhanced by pressure swing operation. Also, when considering secondary cyclic temperature and composition effects, the apparatus generates cyclic variations of pressure, flow and gas composition over the catalyst and adsorbent beds, and thus provides great flexibility to exploit these variations, so as to improve productivity, conversion and selectivity in certain catalytic reactions.

In chemical gas phase reactions the invention provides closed integration of a catalytic or non-catalytic reactor with an adsorbent bed and the Stirling thermodynamic cycle. The adsorbent bed separates reactants and products of the chemical reaction to drive the reaction toward high conversion; while the Stirling cycle removes and usefully converts heat from exothermic reactions or provides heat to endothermic reactions. The exothermic reactions take place in the space associated with a leading phase volume displacement, while endothermic reactions take place in the space associated with the lagging phase volume displacement.

A detailed disclosure following, related to accompanying drawings, describes several preferred apparatus and methods according to the invention, which are capable of expression in apparatus and methods other than those particularly described and illustrated.

DETAILED DISCLOSURE

FIG. 1

Figure 1:
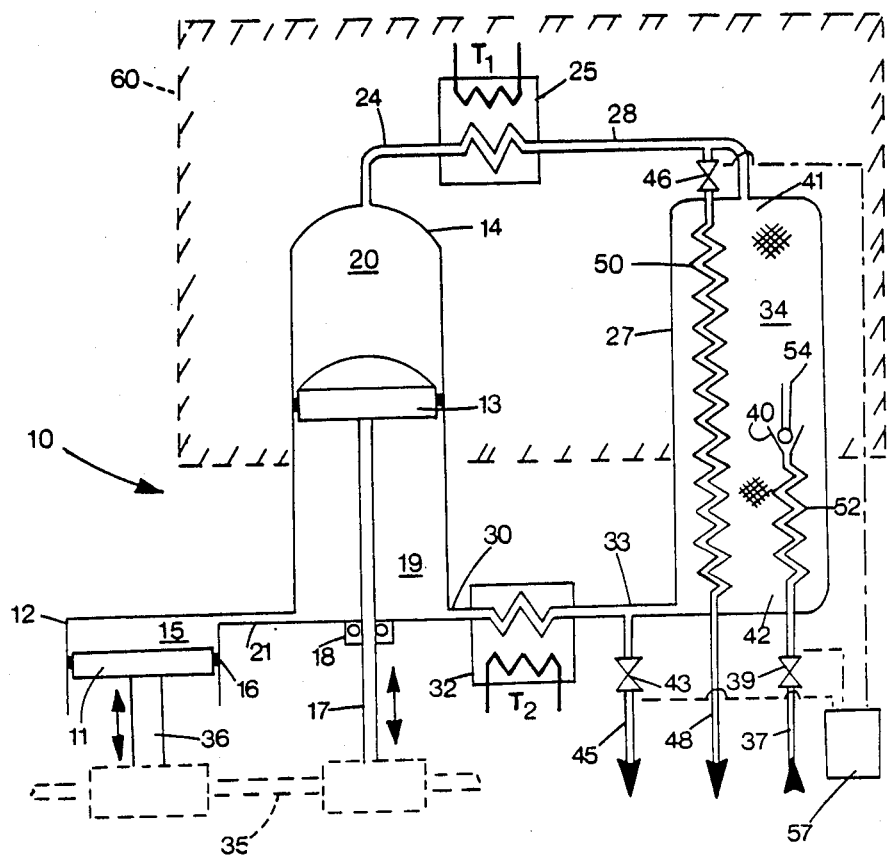
FIG. 1 is a simplified schematic of a Stirling cycle pressure swing adsorption apparatus, including a modification to provide a low temperature pressure swing adsorption apparatus with Stirling cycle refrigeration.

A Stirling cycle machine 10 has a single acting power piston 11 reciprocating in a power cylinder 12, and a double-acting displacer piston 13 reciprocating in a displacer cylinder 14. The power cylinder encloses a variable volume 15 sealed by a high pressure piston seal 16.

The displacer piston 13 is driven by a displacer rod 17 having a cross sectional area which is small with respect to the cross sectional area of displacer cylinder 14. The displacer rod 17 is sealed by a high pressure gland seal 18. The displacer piston 13 divides the internal volume of displacer cylinder 14 between a variable volume 19 adjacent the gland seal 18 and a variable volume 20. The variable volume 19 is connected to the variable volume 15 by a conduit means 21. The variable volume 20 is the expansion volume or the first space of the Stirling machine, while the sum of the variable volumes 15 and 19 is the compression volume or the second space of the machine. The pistons 11 and 13 serve as a first volume displacement means and a second volume displacement means, respectively, which communicate with the first space 20, and with the second space (15 and 19) respectively.

The variable volume 20 is connected by a conduit means 24 to a first heat exchanger 25 maintained at a temperature $T_1$, which in turn is connected to a thermal regenerator 27 by conduit means 28. The variable volume 19 is connected by conduit means 30 to a second heat exchanger 32 maintained at a temperature $T_2$ which will often approximate ambient temperature, which in turn is connected to the thermal regenerator 27 by a conduit means 33. It is evident that gas within the expansion volume or first space i.e., volume 20 and the conduits 24 and 28 will be maintained approximately at temperature $T_1$, while gas within the compression volume or second space, i.e. volumes 15 and 19, and the conduits 30 and 33 will be maintained approximately at temperature $T_2$. It can be seen that a temperature or thermal gradient between $T_1$ and $T_2$ will be maintained across the regenerator 27 between the connections to conduits 28 and 33. The volumes 15,19 and 20, the conduits and associated heat exchangers and the thermal regenerator provide a flow path of the apparatus, which has a working volume. While the heat exchangers 25 and 32 are shown spaced from the cylinders enclosing the respective volumes, following conventional Stirling cycle machine design, the heat exchangers could be incorporated into the cylinder walls.

A reciprocating means 35 interconnects rods 36 and 19 of the pistons 11 and 13 so that the pistons are reciprocated at the same frequency and with suitable phase such as that an increase (or decrease) of the expansion volume leads an increase (or decrease) of the compression volume. Hence upwards motion of the displacer piston 13 leads upwards motion of the power piston 11. The Stirling machine will then operate to convey heat from the heat exchanger 25 to heat exchanger 32 i.e., there is a net transport of heat from the expansion space to the compression space. If $T_1$ is greater than $T_2$, first and second ends 41 and 42 of the regenerator are associated with relatively hot and relatively cold spaces respectively, and the machine will function as an engine, delivering work from the power piston 10. Conversely, if $T_2$ is greater than $T_1$, the ends 41 and 42 are associated with relatively cold and hot spaces respectively and the machine will operate as a heat pump or refrigerator, absorbing work from the power piston 10.

In a conventional Stirling engine, the regenerator contains finely divided material with high heat capacity and large surface area, arranged to adsorb and store heat from gas flowing through the regenerator with efficient heat transfer and low flow friction. In order to achieve the purposes of the invention, the regenerator 27 also contains fixed adsorbent material 34 which preferentially adsorbs a first component of a feed gas mixture relative to a less readily adsorbed second component, in the operating pressure and temperature regime, both of which vary cyclically within the reversing flows of gas as will be described.

Hence the regenerator includes an adsorbent bed of a sorbent which provides a sorption function, such as surface adsorption, bulk absorption and desorption. The adsorbent material may be mixed with non-adsorbent material, and different adsorbent materials or mixtures of material may be used in zones of the regenerator operating at different temperature levels. Alternatively, all of the material in the regenerator may be the adsorbent material which then also provides the full heat storage function. For particular applications as will be described with reference to FIG. 8, some of the adsorbent may also have catalytic properties with respect to reactions of mixing gas components. Particularly in heat pump or refrigerator embodiment, the heat capacity of the solid material must be large with respect to the heat capacity of the working fluid. The regenerator and the adsorbent bed cooperate to produce an adsorbent/regenerator combination but the term "regenerator", "adsorbent bed", "bed" and "regenerator combination" are used interchangeably in this specification except where so stated.

The adsorbent or catalyst bed may be a packed bed of pellets, fibres or granular material, which may be mixed with metallic material to augment heat capacity. Adsorbent or catalyst material may also be formed in monolithic blocks with multiple parallel flow passage, similar to well known honeycomb catalytic support. Adsorbent or catalyst material also may be bonded in thin layers to metal supports, or to metal heat exchange surfaces as done with catalytic tube wall reactors, or maybe a liquid retained in a matrix. Stirling machine regenerators use a variety of well known configurations to meet conflicting performance objectives of high heat capacity and large internal surface area with excellent heat exchange, low pressure drop, low dead volume and low thermal conductivity between hot and cold ends. To avoid the pressure hysteresis problems previously referred to with reference to U.S. Pat. No. 3,262,277 (Nesbitt), when the present invention is used with vapours near their saturation pressure it is important that the adsorbent material is selected to have a pore structure and other characteristics to avoid capillary condensation.

In this invention, the working fluid in the Stirling machine is a gas mixture containing a first component (or components) more readily adsorbed on the adsorbent 34 than remaining component(s) in the mixture. The gas mixture is admitted into the regenerator 27 through an inlet conduit 37 having an inlet valve 39 and a non-return valve 40. First and second outlet valves 43 and 46 are provided in first and second outlet conduits 45 and 48 which communicate with the conduits 33 and 28 respectively.

As the pressure within the Stirling machine is relatively elevated while the gas mixture in the regenerator 27 is flowing toward conduit 28 i.e. towards the expansion volume, the first component of the mixture will be preferentially adsorbed at that time. The pressure is reduced while the gas mixture in regenerator 27 is flowing toward conduit 23 i.e. towards the compression volume, so the first component will be parametrically pumped to the compression space. A first gas fraction or product enriched in the first component will be withdrawn from the conduit 33 through the outlet valve 43 adjacent the end 42 of the bed, while a second gas fraction or product depleted in the first component will be withdrawn from the conduit 28 through the outlet valve 46 adjacent the opposite end 41 of the bed. Optional heat recovery from the second gas fraction to the regenerator 27 can be achieved by a heat exchanger 50 cooperating with the conduit 48.

In many gas purification applications, it will be desirable to introduce the feed gas mixture midway through the regenerator 27 as shown. The feed gas conducted from the inlet valve 39 passes through a heat exchanger 52 in the regenerator 27 through the non-return valve 40 at the desired point of feed injection 54. The preferred locations of the outlet valve 43 and the non-return valve 40 are chosen to minimize the total internal dead volume of the Stirling machine.

If the valves 43 and 46 are directional valves with minimal pressure drop when open, they should each be open only when the pressure is essentially balanced across internal and external conduits, as otherwise the machine could not operate and develop pressure swings. Subject to the above restriction, the valves can in general be operated in batch, semi-batch or continuous separation modes according to application requirements and performance optimization. If valves 43 or 46 are opened during intervals of high pressure, the machine will deliver some work in compression of the corresponding gas stream but with a corresponding reduction in mechanical work output.

Valve control means 57 is provided to control the properly sequenced introduction of feed gas and removal of product gas fractions from the apparatus. The valve control means 57, through suitable undesignated connections shown as broken lines, and sensors if needed, may be programmed to open the valves 43 and 46 only when desired gas concentration levels have been reached in conduits 33 and 28 respectively.

The first product fraction delivered from the apparatus will be mostly highly enriched in the first component if the outlet valve 43 is opened at intervals of *minimum* cycle pressure. Similarly, the second product fraction will be most highly depleted in the first component if the outlet valve 46 is opened at intervals of *maximum* cycle pressure. Hence the outlet valve 46 may be a simple non-return valve, with control provided by external regulation of pressure in the outlet conduit 48. The inlet valve 38 may also be a simple non-return valve, with control provided by internal regulation of pressure in the inlet conduit 37. The outlet valve 43 may be operated mechanically in fixed phase with the piston means to open during intervals of minimum cycle pressure, with control of flow rate provided by external regulation of pressure in the outlet conduit 45.

Injection of feed gas midway in the regenerator can facilitate high purification of both first and second components. According to the value of the two components and the degree of separation desired, it may be more convenient to inject the feed gas mixture adjacent the expansion volume in some applications (i.e., air dehydration), or adjacent the compression volume in other applications (i.e., oxygen separation from air without nitrogen production).

The basic parameters of a Stirling cycle machine include:
(1) the ratio of absolute temperatures $T_1$ and $T_2$;
(2) the ratio of volumetric displacement in compression and expansion volumes;
(3) the phase angle by which net volume displacements in the expansion volume lead volume displacements in compression volume (0° to 180°);
(4) the ratio of total dead volume within the working volume to displacement volume. Note that dead volume includes clearance space in cylinders, conduits, regenerator voidage, and adsorbent porosity.

The above parameters may be varied over wide limits. They determine critical operating characteristics, including:
(a) the ratio of maximum pressure to minimum pressure inside the machine;
(b) the phase relationship between gas flow velocities and pressure at each point in the regenerator;
(c) the ratio of cyclic distance travelled by gas particles in the regenerator to length of the regenerator.

It will be noted that the reciprocating means 35 or piston drive mechanism of the FIG. 1 Stirling machine has not been described in detail. Numerous Stirling machine crank mechanisms and also free piston configurations are known in the prior art, and may be used in conjunction with this invention. Likewise, numerous alternative arrangements of compression and expansion volume displacement means are known such as diaphragms or liquid pistons. The power and displacer pistons may occupy a single cylinder. Separate compression and expansion cylinders may provide the equivalent function of power and displacer cylinders. Compression and expansion cylinders may be compounded in multi-cylinder double-acting Stirling machines. Also, the regenerator may be installed inside the displacer piston of displacer type machines. For purposes of this invention, the above and other prior art Stirling machines configurations are equivalent.

While the Stirling cycle manifestly incorporates cyclic changes in both pressure and gas velocity, it is not immediately evident that a favourable regime for pressure swing adsorptive separation is in fact available. A general theoretical foundation for the present invention is found in a theorem (based on an ideal Stirling machine with isothermal expansion and compression, perfect heat exchange and no friction) correlating flow direction at any point of the regenerator with the pressure extremes. At the cycle pressure maximum, the direction of flow will be from the compression volume toward the expansion volume at all points in the regenerator. At the cycle pressure minimum, the flow direction is from the expansion volume to the compression volume. This theorem is valid for the ideal Stirling cycle machine for all possible parameters of temperature ratio, volume displacement ratio, displacement phase angle and dead volume ratio. Consequently net heat i.e. heat transported over a complete cycle, and the preferentially adsorbed gas component will be transported toward the compression volume or first space in the present invention, while the less readily adsorbed gas component will be transported toward the expansion volume or second space, the relationship of the volumes or spaces being determined by the phase relationship as described.

OPERATION

As stated previously, the Stirling cycle machine 10 can operate either as an engine, producing net work from the power piston 11, and/or a portion of compression work from the gases discharged from the regenerator. Alternatively it can function as a heat pump or refrigerator, absorbing work from the piston 11. When operating in either mode as above, the reciprocating means 35 coordinates the phase relationship between the cyclic pressure variations and the cyclic flow reversals relative to the adsorbent bed so that the volume of gas displaced by the displacer piston 13, the first volume displacement means, leads the volume of gas displaced by the power piston 11, the second volume displacement means. Hence, the volume displacement means coordinates the phase relationship between the pressure and flow reversals such that cyclic gas volume displacements adjacent the first space or the first end 41 of the bed have a leading displacement phase angle with respect to cyclic gas volume displacements adjacent the second space or opposite second end 42 of the bed. This produces the cyclic variations in total pressure and cyclic reversals in direction of flow over the bed so that flow of a first gas fraction under reduced pressure past the bed towards one end of the bed or flow path is enriched in the first more readily adsorbed component, while reverse flow of a second gas fraction under increased pressure past the bed towards the opposite end of the flow path is depleted in the first more readily adsorbed component. This is because the first component is preferentially adsorbed and immobilised by increased pressure on the adsorbent bed when the gas flows in one direction, and the first component is preferentially desorbed when the pressure is decreased and the flow is reversed. The first gas fraction enriched in the more readily adsorbed first component is removed from one end of the bed, while the second gas fraction enriched in the less readily adsorbed component is removed from the opposite end of the bed.

Whether the apparatus is operating either as an engine, a heat pump or refrigerator, the phasing of pressure and the flow cycle is such that, when pressure is at the upper limit for a particular cycle of pressure, the direction of the bulk flow of gas is towards the expansion volume, that is towards the variable volume 20. Similarly, when pressure is at a lowermost point of its cycle, the corresponding direction of bulk flow of the gas is towards the compression volume, that is towards the variable volumes 15 and 19. Also, the Stirling engine or pump can be considered as a means of transporting heat in a particular direction throughout a complete cycle. This is referred to as a net transport of heat, and in the present invention, it has been found that the net transport of heat moves in the direction of flow of the preferentially adsorbed component, that is towards the compression volume, the variable volumes 15 and 19.

In summary, the invention has the dual function of transporting heat and the preferentially adsorbed component in one direction, while transporting the less readily adsorbed gas component in the reverse direction across a temperature or thermal gradient. If the heat is transported in the direction of the lower temperature, the apparatus functions as an engine. If the heat is transported in the direction of the higher temperature, the apparatus is a pump or a refrigerator. The process also includes removing the second gas fraction depleted in the preferentially adsorbed component from the working volume at a time when pressure is approximately at its maximum for the cycle, and removing the first gas fraction enriched in the more readily adsorbed component when pressure is approximately at a minimum for the cycle. The first gas fraction enriched in the first component is removed from the second end of the regenerator combination adjacent the second space. The second gas fraction depleted in the first component is removed from the first end of the regenerator combination adjacent the first space.

In practice the effective adsorbent selectivity may be modified by kinetic rate effects. In cases where equilibrium selectivity dominates, preferably pressure variations should be closely in phase with velocity variations over the adsorbent. In the idealized case of isothermal expansion and compression processes in the regenerator/adsorbent bed, perfect heat transfer, no friction effects, low pressure ratios and a phase angle of about 90 degrees, an important relationship between temperature ratios and displacement ratios is found as follows. The first and second volume displacement means, namely the displacer piston 13 and the power piston 11 respectively have respectively amplitudes of reciprocation and are associated with the first and second spaces respectively. The ratio of amplitudes of the displacements of the first and second volume displacement means is approximately equal to the ratio of the higher temperature to the lower temperature at opposite ends of the thermal regenerator, when the temperatures are expressed in degrees Kelvin. Since flows in different portions of a Stirling engine regenerator are not in phase because of compressibility effects, the optimum phase of the pressure swings will be sensitive to the distribution of the adsorbent in the regenerator. In cases where adsorbent selectivity is strongly affected by rate effects, substantially different phase relationships may offer best performance. It should be noted that some phase shift will be caused by wave propagation delays in pores of the adsorbent, and that these effects may be substantial at higher operating speeds depending on adsorbent structure. At excessively high speeds, gas separation will be impaired.

Adsorbent working capacity and selectivity will generally be improved by higher cycle pressure ratios. The Stirling cycle pressure ratio is sensitive to the phase angle and amplitude ratio of volume displacements, the temperature ratio expressed in degrees Kelvin, the ratio of dead volume to displacement volume and in this invention to the adsorbent working capacity. Pressure ratio is higher for smaller phase angles beween expansion and compression displacements, for lower ratios of dead volume to displacement volume and for lower adsorbent working capacities.

In the design of conventional Stirling engines, it is generally desired to achieve high efficiency and high power density, hence high operating speeds. Dead volume must be substantial in order that effective heat exchange with low flow friction losses will be achieved. The phase angle between compression and expansion displacements is usually about 90°, which favours good efficiency and power density. In the present invention, limitations on operating speeds may be required by use of a highly porous structure and limited mechanical strength of common adsorbent materials. Hence, Stirling machines designed according to the invention will often be a relatively low speed machines, operating sometimes in the order of a few revolutions per minute. For machines delivering mechanical power, the phase angle should be between 30 degrees and 150 degrees.

Figure 2:
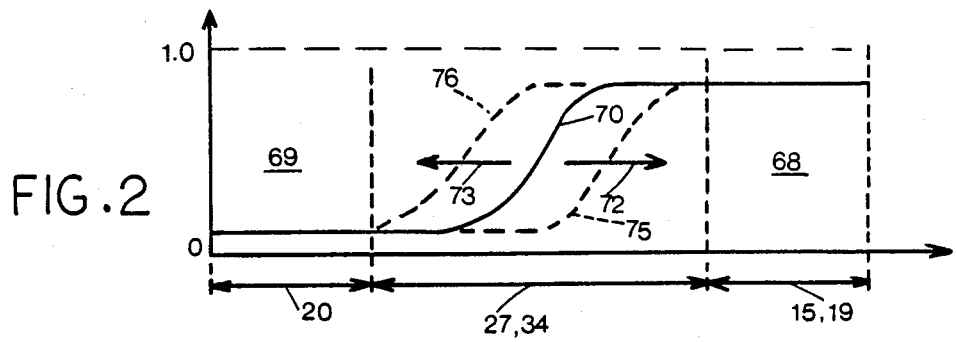
FIG. 2 is a simplified diagram in graph form, showing temperature and gas composition regimes adjacent an adsorbent/regenerator combination of the FIG. 1 embodiment for a two component mixture and associated wavefront.
Figure 3:
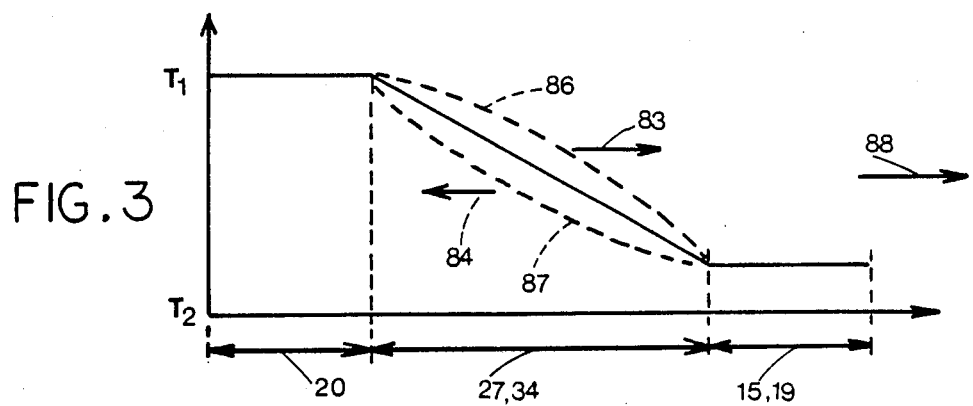
FIG. 3 is a simplified temperature profile for a Stirling cycle engine embodiment, assuming isothermal expansion and compression, adjacent the regenerator combination of FIG. 1 embodiment.
Figure 4:
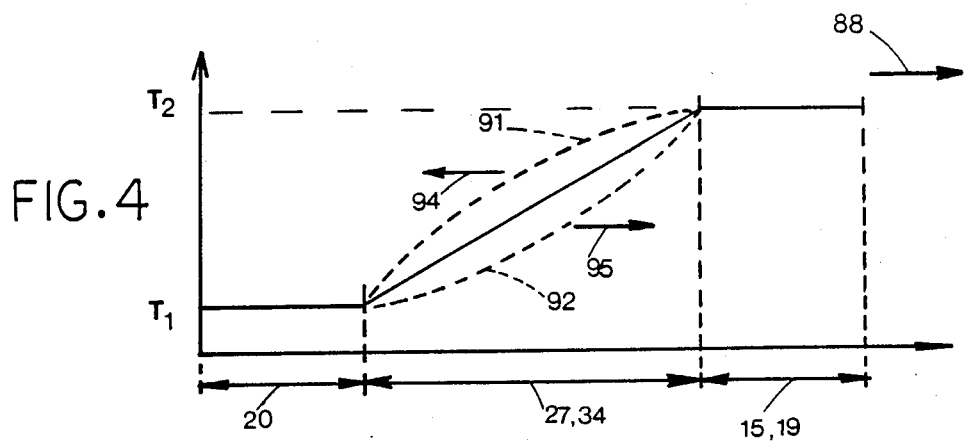
FIG. 4 is a simplified temperature profile for a Stirling cycle heat pump embodiment, which is analagous to the FIG. 3 temperature profile.

FIGS. 2 through 4

Major characteristics of the gas mixture within the thermal regenerator and adjacent the adsorbent bed will now be described.

Referring to FIG. 2, the horizontal axis of the graph represents linear position of the gas flow path through the adsorbent/regenerator combination 27, 34, from adjacent the expansion volume or space 20 to the compression volume or space 15,19. The vertical axis of the graph designates approximately gas composition mixture when expressed as mole fractions of a two component gas mixture. The gas mixture has a more readily or strongly adsorbed component 68 concentrated towards the compression space, while the less readily or strongly adsorbed component 69 is concentrated towards the expansion space. A concentration wave front 70 exists between regimes of the two components and moves cyclically in the same direction as the bulk gas flow, which is shown as an arrow 72 when the gas flows towards the compression space, and as an arrow 73 when it flows towards the expansion space. The wave front velocity is lower than the bulk gas flow by an amount dependent on adsorbent selectivity. Ideally the wave front will move between extreme positions 75 and 76 shown as broken outlines so as to avoid "breakthrough" of the wave front beyond ends of the regenerator bed, for reasons as will be described.

Referring to FIG. 3, the horizontal axis of the graph is identical to that in FIG. 2, and the vertical axis of the graph depicts temperature of the gas. Thus this is a simplified temperature profile with $T_1$ being the temperature adjacent the expansion volume of the regenerator, and $T_2$ being the temperature adjacent the compression volume for an engine. Arrows 83 and 84 represent flow directions for the instances of minimum and maximum pressures of the cycle respectively. At the moment of minimum pressure, flow is towards the compression space 15, 19 per the arrow 83. In the conventional Stirling engine, the gas would tend to warm the regenerator material by forced convection, creating an upward temperature swing or rise as shown in broken outline as 86. In the present invention, this temperature swing tends to increase the desorption induced by the pressure minimum, but will itself be cancelled in part by cooling induced by the latent heat of desorption. Conversely, at the moment of maximum pressure, the flow per arrow 84 is towards the compression space 20 and the adsorption induced by the pressure swing tends to be reinforced by a downward temperature swing of the bed shown as broken line 87, which is not cancelled by the latent heat of adsorption. In prior art Stirling engines, the temperature swing effect would be as shown by the broken lines 86 and 87 in FIG. 3, which would contribute to efficiency losses, without the aforesaid compensating effect of the invention associated with the latent heat of adsorption. Hence the engine embodiment of the present invention offers improvements both to the effectiveness of the adsorption process, and also to the cycle thermodynamic efficiency in this aspect. An arrow 88 represents direction of net heat transport.

FIG. 4 is an analagous simplified temperature profile for a heat pump embodiment in which the expansion space 20 is at $T_1$ which is lower than the compression space 15, 19 which is at $T_2$. In a conventional Stirling cycle heat pump, there is an upward temperature swing 91 and a corresponding downward temperature swing 92, both shown in broken outline. The upper temperature swing now arises with the maximum pressure flow, shown in direction of arrow 94, which is in opposition to the desired adsorption. The amplitude of the temperature swing will be increased further by the release of latent heat by pressure swing induced adsorption. Hence, in the heat pump embodiment the temperature swing is adverse to gas separation effectiveness and to cycle thermodynamic efficiency. It will thus be desirable to provide high heat capacity in the heat pump regenerator so as to minimise the actual temperature swing. The arrow 88 again represents direction of net heat transport.

Adsorbent selectivity between the gas components has an effect on the operation of this invention. The term "preferentially" as used herein refers to a component that is more readily adsorbed relative to a second component when the adsorbed molar concentration of the first species changes relatively more strongly with varying partial pressure of the first species, while the adsorbed molar concentration of the second species changes relatively less strongly with varying partial pressure of the second species. The above occurs within the operating regime of pressures, temperatures, gas compositions and cycle speeds over a particular portion of the adsorbent bed. This definition relates selectivity to the active adsorption and desorption of gas species under pressure swings, as opposed to the static capacity of the adsorbent bed under some average condition.

In the case of high adsorbent selectivity between gas components and/or large capacity of the adsorbent bed, the velocity of the concentration wave front will be a small fraction of the gas velocity. Then a relatively short adsorbent bed can achieve good separation, without "break through" of the wave front beyond the regenerator. Break through would cause mixing to reduce the separation achieved. The finite width of the concentration wave front must be considered in design optimization.

In the case of low adsorbent selectivity between gas components and/or large capacity of the adsorbent bed, the velocity of the concentration wave front will more closely approach that of the gas velocity. Break through of the wave front can be avoided or minimized by using a relatively low phase angle between compression and expansion displacements, and/or by using a relatively high dead volume (within the regenerator) which will reduce attainable pressure ratio. It may be desired to reduce the adsorbent capacity (for example by admixture with non-adsorbent material, or by use of thin adsorbent coatings) in order that the machine more closely approach the operating characteristics of a conventional Stirling machine, with gas separation as a secondary role.

Some examples of specific applications of the FIG. 1 embodiment are now described.

EXAMPLE NO. 1

Oxygen separation from air may be achieved using a zeolite such as molecular sieve 13X, which adsorbs nitrogen more readily than oxygen. Air is introduced through the inlet valve 39. An oxygen enriched gas fraction will be produced through the outlet valve 46, while a nitrogen enriched fraction will be produced through the outlet valve 43. If temperature $T_2$ is ambient temperature and heat is supplied to the heat exchanger 25 such that temperature $T_1$, is greater than temperature $T_2$, the machine is a Stirling engine which will deliver mechanical work after losses are taken into account. With the adsorbent operating at elevated temperature, it will be necessary to use a relatively high mean working pressure to achieve adequate adsorbent loading and selectivity. Thus air entering inlet valve 39 must be already compressed.

Conversely if the heat exchanger 25 is at a lower than ambient temperature i.e., temperature $T_1$ is less than temperature $T_2$ the machine can be a combined refrigeration and dehydration and air separation plant. The refrigerator will actively reduce temperature $T_1$ below ambient until the cooling load including thermal leakage is in balance with the machine's cooling capacity. The heat rejection temperature $T_2$ and the position of the feed injection point 54 in regenerator 27 are designed to ensure that the temperature at the feed injection point is above zero degrees centrigrade, to prevent frost formation in the regenerator. Then water, carbon dioxide and nitrogen will be concentrated toward the outlet valve 43 at the warmer portion of the apparatus, while oxygen will be concentrated to the outlet valve 46 at the colder end.

In this case it will be appropriate to operate at a much lower mean working pressure than in the case of the engine, because the adsorbent loading must be kept well below saturation in order to achieve good selectivity. Good separation may be achieved at temperatures between zero degrees centrigrade and minus 75 degrees centrigrade with air introduced to the machine at atmospheric pressure.

A simple modification to the embodiment of FIG. 1 enables the apparatus 10 to perform pressure swing separations at low temperatures using a Stirling refrigeration cycle. The modification includes elimination of both the heat exchanger 25 cooperating with the conduits 24 and 28, and the heat exchanger 50 within the regenerator. Portions of the apparatus associated with the expansion volume 20, the conduits 24 and 28 and the first end 41 of the regenerator 27 are enclosed in an insulating jacket 60, broken outline, to reduce heat transfer from ambient into the portion of the machine which is cold. There is no external refrigeration load, and heat leakage into the cold portions of the machine is minimised by the thermal insulation enclosure. This embodiment is particularly suitable for adsorption separations most effectively performed at reduced temperatures. Mechanical work expended in refrigeration to keep the expansion volume of the machine sufficiently cold is offset by reduced compression work for separation where favourable adsorbent uptake and selectivity are achieved at low pressure and at reduced temperatures. The low temperature $T_1$ is attained in conduits 24 and 28 and adjacent spaces and can be used for various separations, one example of which is shown below.

EXAMPLE NO. 2

If the working fluid is air, the modified machine will deliver cold oxygen enriched air through the outlet valve 46, and this will represent the cooling load. If the adsorbent has no selectivity for oxygen and nitrogen separation, but strongly adsorbs water, the machine delivers cold dehydrated air and may be used as a frost-free air cycle refrigerator.

This apparatus is evidently suitable for many gas or vapour phase separations, including all the present applications of conventional pressure swing adsorption. The gas separation process is conducted in a combined cycle with thermal power conversion or refrigeration. The invention provides full scope and much flexibility for energy recovery from gas separation processes.

EXAMPLE NO. 3

Hydrogen is a preferred working fluid for Stirling cycle machines because of its unique heat transfer properties and low viscosity. It is known that heavy hydrogen isotopes (deuterium and radioactive tritium) are differentially adsorbed relative to ordinary hydrogen on many materials including hydride forming metals at ambient or elevated temperatures, and on zeolite at low temperatures. Stirling engines or cooling machines may use hydrogen as a working fluid, while concentrating the trace isotopes. In nuclear power plants, dual function Stirling machines according to the invention could use helium as the working fluid to concentrate tritium contaminated reactor coolant helium. Tritium recovery is important for safety reasons, and in future fusion power plants will be important because of the fuel value of the tritium. Using appropriate isotope selective adsorbent, deuterium in natural hydrogen may also be concentrated by Stirling cycle engines or cooling machines adapted according to this invention. Higher concentration ratios may be achieved in large installations by cascading engines or cooling machines in series and parallel multi-stage separation plants.

ALTERNATIVES AND EQUIVALENTS

FIG. 5

A second main embodiment of the invention 102 serves as a thermo compressor, which has a thermodynamic cycle which is more closely based on the well known Ericsson cycle rather than the Stirling cycle. The main difference between this embodiment and that of the FIG. 1 is that the power piston 11 and associated power cylinder 12 are eliminated because the engine delivers compression work as opposed to mechanical work. Other features of the invention are basically similar to the embodiment FIG. 1 and are described briefly as follows.

A displacer cylinder 104 has a double-acting displacer piston or means 106 mounted on a displacer piston rod 108 which is sealed with high pressure seals 109, and has a small cross sectional area relative to cross sectional area of the cylinder 104. The rod 108 is reciprocated by a reciprocating means 110. The displacer piston 106 divides the cylinder 104 into the first space, or expansion volume 111, and a second space or compression volume 113. A conduit 115 extends from the first space 111, through a heat exchanger 117 to a first end 118 of a thermal regenerator 119. The thermal regenerator also contains adsorbent material 120 and is an adsorbent/regenerator combination essentially similar to the combination regenerator of FIG. 1. The regenerator has a heat exchanger 121 extending from a non-return valve 123 to an outlet conduit 125 which delivers a gas fraction from the first end 118. An inlet conduit 126 has outer and inner non-return inlet valves 128 and 129, a heat exchanger 130 and a discharge or point of injection 132 within the regenerator to determine the point of discharge of feed gas mixture fed into the apparatus. A conduit 134 extends from an opposite or second end 133 of the thermal regenerator, through a heat exchanger 136 and communicates with the second space 113 or compression volume. An outlet conduit 138 communicates with the second end 133 and has an outlet valve 139 which is controlled through a valve control means 140 to open to discharge a gas fraction as required.

When compared with the first embodiment, it can be seen that, in effect, the previously described first and second volume displacement means are combined into the first double-acting displacer piston or means 106 so that the phase angle between the first and second displacer means is 180 degrees. This results in the compression volume and expansion volume being almost equal and 180 degrees out of phase. The machine can be either operated as an engine, in which case $T_1$ is higher than $T_2$, or as a heat pump or refrigerator, in which case $T_2$ is greater than $T_1$. As there is no power piston, only modest pressure ratios can be achieved even with high temperature ratios unless one of the components changes phase while in the regenerator combination 119,120. In operation of the engine, there will be a substantial phase difference between pressure variations and flow in the regenerator, approaching 90 degrees in the limit to zero feed throughput when the apparatus ceases to deliver any useful work. This phase difference is reduced in a preferred operation mode in which the outlet valve 139 is opened by the control means 40 during the lowest pressure interval of the cycle. Phase shift between pressure and regenerator flow can be further reduced by increasing feed throughput, at a penalty of reduced pressure ratio. In effect, this process involves converting a portion of the heat supplied to the relatively hot space to compression work by delivering at least a portion of the separated gas fraction at elevated pressure relative to the pressure at which the feed gas mixture is introduced into the process.

EXAMPLE NO. 4

Figure 5:
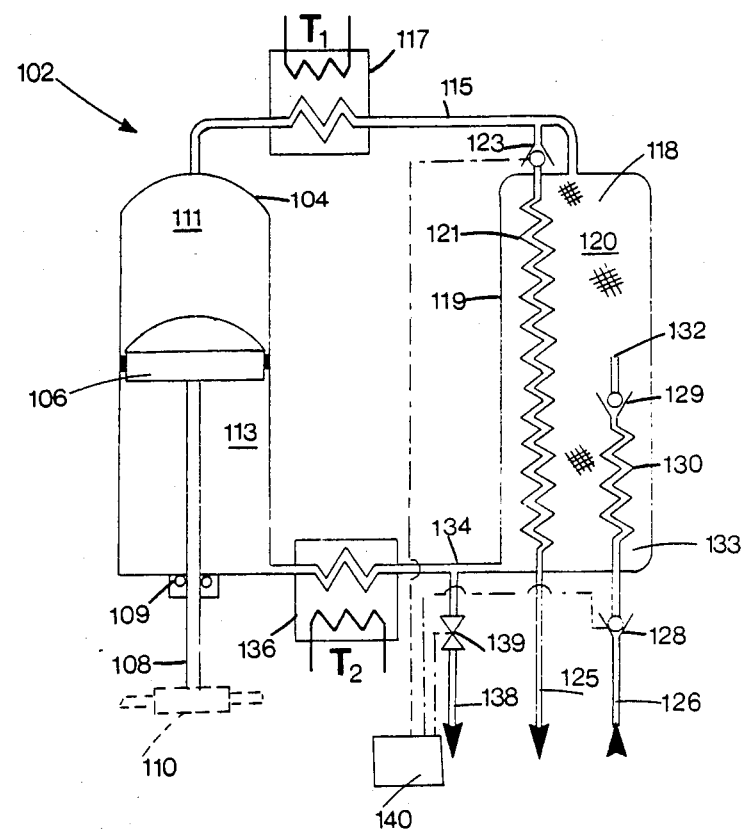
FIG. 5 is a simplified schematic of a single displacer thermocompressor pressure swing adsorption apparatus.

This FIG. 5 embodiment has the advantage of extreme simplicity. Its use will be attractive in applications where a highly adsorbed contaminant is to be removed from a gas which is also to be compressed. For example, well head natural gas compression can be combined with purification to remove hydrogen sulphide, water and carbon dioxide, while the gas itself is compressed through a modest pressure ratio. In this particular example, the heat source to power the apparatus may be provided by combustion of the waste gas stream.

In view of the substantial phase shift in the regenerator between pressure and flow, this embodiment may be applied more favourably to separations where adsorptive selectivity is controlled by rate effects, since regenerator flow will be approximately in phase with the time rate of change of pressure.

A simple modification to the FIG. 5 embodiment 102 is to substitute the non-return valves 123 and 128 for positively timed, two-wave valves which are also controlled by the control means 140, by undesignated connections shown in broken outline. This alternative apparatus may be operated in close analogy to a Gifford-McMahon cooling machine. In this alternative, temperature $T_2$ may be ambient, and temperature $T_2$ is greater than $T_1$. The apparatus is now powered by compression energy of a pressurised feed gas mixture introduced through the inlet valve 128 in the inlet conduit 126. The valve 128 is opened after the displacer piston 106 is extended to an outer portion of the stroke so that the compression space 113 is at its maximum and the pressure is fairly low and the outlet valve 139 is closed. The entering feed gas mixture through the conduit 126 compresses gas already in the compression space 113 until the valve 123 is opened by the control means to deliver some product gas fraction depleted in the more readily adsorbed component. The pressure in the conduit 125 is now slightly less than the supply pressure in the conduit 126. The inlet valve 128 is closed, and the displacer piston 106 is retracted to the bottom of its stroke, displacing gas from the compression space 113 to flow through the regenerator 119 into the space 111 with cooling over the regenerator and through a consequent pressure drop. The outlet valve 139 is then opened, reducing pressure further and delivering gas enriched in the more adsorbed component. When the pressure in the system is reduced to the minimum level, the valve 139 is closed and the displacer 111 retracts to displace gas from the space 113 through the regenerator to the space 111, becoming warmer and thus providing an initial pressure rise to complete the cycle.

The Gifford-McMahon cycle has a major advantage that high pressure ratios can be imposed externally, but, unlike other embodiments, has the disadvantage of relatively low thermal efficiency because of irreversible gas expansion.

FIG. 6

A third embodiment of the invention 148 utilises two similar displacer and regenerator combinations, within a single working volume, in which the two displacers are operated out of phase. The apparatus has a flow path having generally similar first and second portions 150 and 151 respectively which resemble a flow path portion of the FIG. 5 embodiment and have first and second displacer cylinders 153 and 154 with first and second double-acting displacers 155 and 156 respectively. The displacers 155 and 156 have respective rods 159 and 160 which cooperate with a reciprocating means 162 to reciprocate the displacers within the respective cylinders at equal frequencies but phased apart. The first displacer 155 divides the cylinder 153 into a first space or an expansion space 163 and a second or compression space 165. The displacer 156 divides the cylinder 154 into a first space or expansion space 168 and a second space or compression space 170. A connecting conduit 172 interconnects the compression 165 and 170 so that pressure throughout the embodiment 148 is essentially equalised.

A first thermal regenerator 175 has a first end 174 connected by conduits 176 and 177 to the expansion and compression spaces respectively of the first cylinder 153. Heat exchangers 178 and 179 at temperatures $T_1$ and $T_2$ cooperate with the conduits 176 and 177 respectively to maintain the adjacent spaces at the particular temperatures of the heat exchangers. An inlet conduit 181 controlled by a non-return inlet valve 182 feeds a feed mixture of gases into a second end of 180 the regenerator adjacent the expansion space 165. An outlet conduit 183, controlled by a non-return outlet valve 184 discharges from the first end a gas component separated from the gas mixture, and also cooperates with the conduit 176. An outlet conduit 187 controlled by a mechanically operated outlet valve 188 discharges from the second end another gas fraction. The regenerator 175 contains adsorbent material 189 and thus is an adsorbent/regenerator combination in accordance with the invention. It can be seen that the first portion 150 of the apparatus resembles closely the thermo compressor embodiment 102 of FIG. 5, with the exception of removal of heat exchanger within the regenerator.

In contrast, the second portion 151 of the flow path has a second thermal regenerator 190 which contains non-adsorbent heat storage material, i.e., the regenerator 190 is basically conventional and is *not* a combination regenerator. Thus, the portion 151 does not provide any gas separation function, and instead is to provide an appropriate connection to the phase angle between the first and second portions. This is to attain the desired pressure variations in a desired phase relationship with flow through the regenerator combination 175,189 and also to improve the pressure ratio that is normally relatively low with use of the single thermo compressor of FIG. 5. The second portion 151 has conduits 192 and 193 interconnecting the regenerator 190 with a first or expansion space 168 and a second or compression space 170 of the cylinder 154. Heat exchanges 195 and 196 at temperatures $T_3$ and $T_2$ respectively cooperate with the conduits 192 and 193 so as to maintain the respective expansion spaces 168 and 170 at the required temperatures. Clearly both regenerators 175 and 190 are exposed to respective thermal gradients due to the adjacent heat exchangers.

Preferably, the displacer cylinder 156 has a larger displacement than the cylinder 153 so that pressure variations from the second portion 151 dominate the flow within the first portion 150. This enables a higher pressure ratio to be attained, and increase flexibility of design, both with reference to temperature variations and cycle efficiency. When the piston 156 is fully extended, the pressure is reduced by cooling gas drawn into the space 170. Similarly, when the piston 156 is fully retracted, the pressure is increased by heating gas drawn into the space 168.

When operated as a thermo-compressor, temperature $T_1$ is equal to temperature $T_3$, both of which are greater than temperature $T_2$, which is commonly ambient. Thus the thermal gradients have equal upper temperatures and equal lower temperatures. Compared to the more simple thermo-compressor of FIG. 5, the embodiment 148 has much greater flexibility to obtain an optimal phase relationship between the pressure swing and gas flow over the adsorbent/regenerator combination 175, 189. This embodiment is more suitable for separation of less strongly adsorbed gases, when compared with the previously described embodiment of FIG. 1.

In summary, when considering the first portion 150 of the flow path as a thermocompressor, it can be seen that the first and second volume displacement means, as previously defined, have been combined into a first double-acting displacer means 155, so that the phase angle between the first and second volume displacement means is 180 degrees. The displacer cylinder 153 cooperates with opposite ends of the regenerator combination 175, 189 and with the displacer means 155 so that the displacer means 155 separates the first and second spaces. The regenerator combination 175,189 has a thermal gradient defined by first and second temperatures $T_1$ and $T_2$, in which the first space of the working volume is a temperature $T_1$ and the second space of the working volume is at the temperature $T_2$. When referring to the second portion 151, the second thermal regenerator 190 cooperates with opposite ends of the second displacer cylinder 154 and is subjected to a second thermal gradient defined by the second temperature $T_2$ and a third temperature $T_3$ in which the third temperature equals the first temperature $T_1$. Thus the thermal gradients of the regenerators of each portion are essentially equal.

EXAMPLE NO. 5

An attractive application for the thermo-compressor embodiment as above described is production of preheated and compressed oxygen enriched air for combustion in a furnace, gasifier or high temperature engine cycle. Some of the combustion heat or waste heat is applied to the heat exchangers 178 and 195. Air is supplied through the non-return inlet valve 182 through the inlet conduit 181, and oxygen depleted air is released at ambient temperature through the outlet valve 188, which is opened at intervals of minimum cycle pressure. Hot compressed oxygen is delivered through the non-return valve 184 in the outlet conduit 183 to the combustion furnace or other load.

Figure 6:
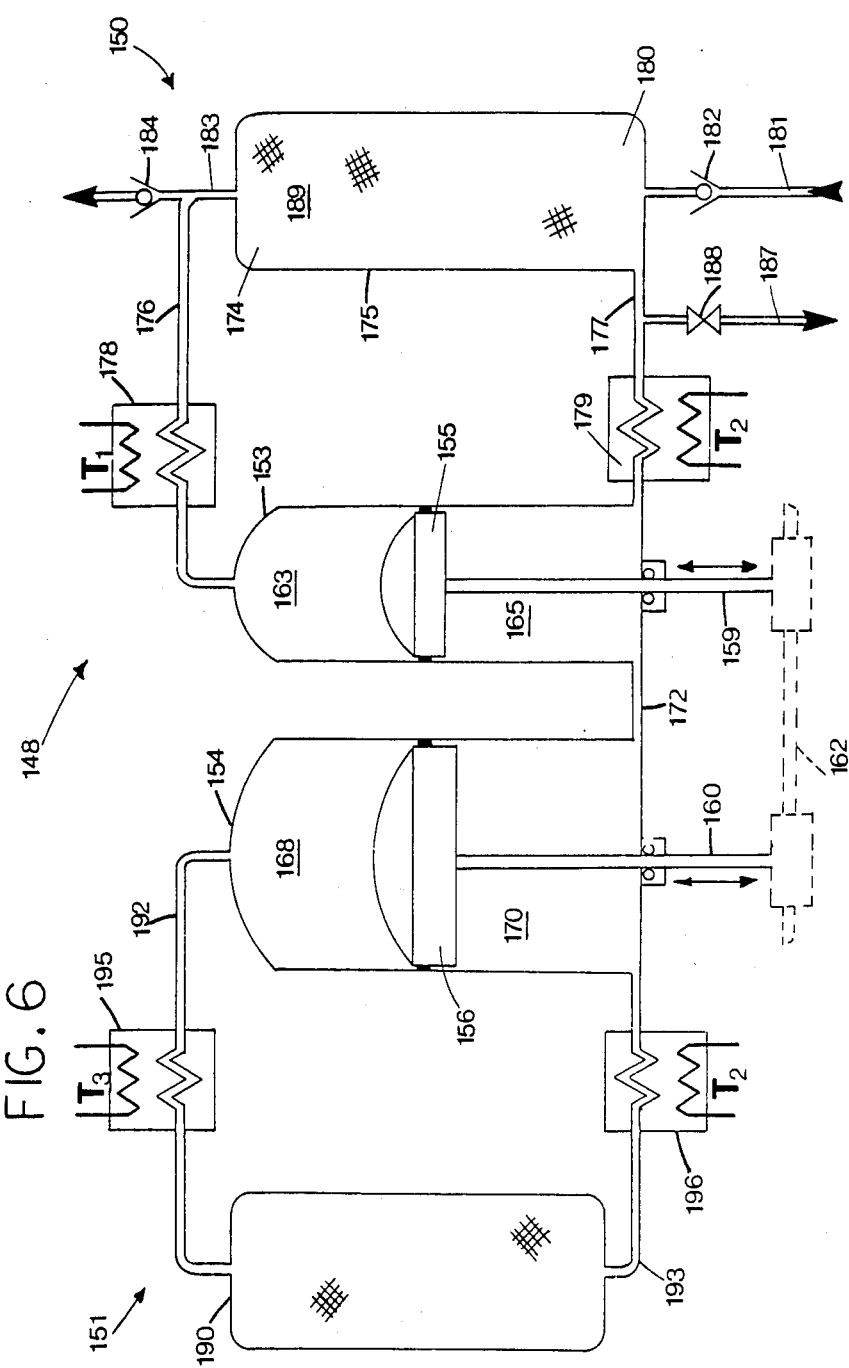
FIG. 6 is a simplified schematic of a thermally coupled pressure swing adsorption apparatus with two displacers.
Figure 7:
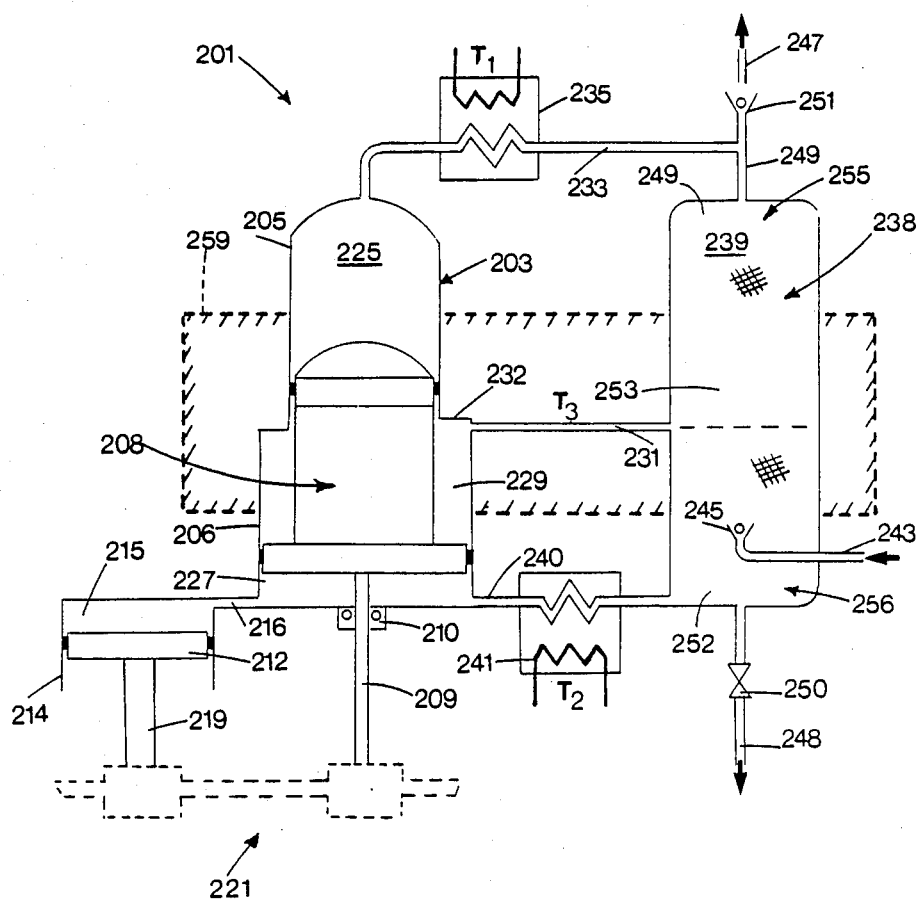
FIG. 7 is a simplified schematic of a gas separation apparatus powered by a heat source, with a portion of the adsorbent/regenerator combination being cooled.

An alternative application of the FIG. 6 embodiment is for operation as a modified Vuilleumier cycle cooling machine so as to operate between a low temperature and ambient. In this alternative, pressure swings in the apparatus are generated by thermo compression. When operated as a Vuilleumier refrigerator or as a heat pump, the larger displacer 156 cooperates with the regenerator 190 which operates as a thermocompressor, imposing a pressure regime on the regenerator 175. The smaller displacer 155 imposes correctly phased flows to obtain a cooling effect at the heat exchanger 178 at the temperature $T_1$. In this alternative, the temperature $T_3$ is greater than the temperature $T_2$, and the temperature $T_1$ is lower than temperature $T_2$. The reciprocating means 162 is modified so that the displacer 156 leads the displacer 155 by about 90 degrees of phase. The regrigeration effect will be delivered partly as cooling load at the heat exchanger 178, and partly as a cold compressed gas delivered from the non-return outlet valve 184.

It is evident by comparison with the previous embodiment that alternative design selections of inlet and outlet valves, associated heat recovery coils and the feed injection location, not shown specifically, in the regenerator combination 175 are admissable within the scope of this invention and that features of the particular embodiments shown may be interchanged.

In summary, the refrigeration alternative of the FIG. 6 embodiment differs from the thermo-compressor embodiment mainly in the thermal gradients imposed on the regenerator. The regenerator combination 175 of the first portion, which has the adsorbent 189, has a thermal gradient defined by first and second temperatures in which the first temperature is lower than the second temperature and the second temperature is near ambient. However the second portion of the flow path has the second thermal regenerator 190 (without an adsorbent) and is subjected to a second thermal gradient defined by the second temperature $T_2$ and the third temperature $T_3$, in which the third temperature is elevated above ambient. Various means to supply heat to the apparatus at the third temperature are provided, so as to drive the displacer and reciprocating means in such a manner as to obtain gas separation together with refrigeration functions.

FIG. 7

A fourth embodiment 201 of the invention is for gas separation, and may be coupled together in series or in parallel to provide multiple separation steps of a complex process. Furthermore, as will be described with reference to FIG. 8, this invention, as well as the previously described embodiments, can also be used for chemical reactions. The fourth embodiment shows direct coupling of an engine with a refrigerator within a single Stirling cycle machine. One particular use of this embodiment is to deliver hot compressed oxygen to a high temperature combustion process, in which the machine can be powered entirely by waste heat from the combustion process, thus avoiding the high cost of mechanical energy required for conventional air separation processes.

The embodiment 201 includes a stepped displacer cylinder 203 having outer and inner cylinder portions 205 and 206, in which the portion 205 is smaller in diameter than the portion 206. A stepped displacer 208 is complementary to the inner and outer cylinder portions and has a displacer rod 209 which is sealed at 210. A power piston 212 is reciprocable within a power cylinder 214 and a conduit 216 interconnects of variable volume 215 of the power cylinder with the inner cylinder portion 206. The piston 212 has a piston rod 219 which, similarly to the rod 209 cooperates with a reciprocating means 221 which reciprocates the piston 212 and the displacer 208 within their respective cylinders, at a similar frequency but phased apart. The displacer 208 divides the internal volume of the displacer cylinder 203 into a variable volume 225 in the outer cylinder portion, a variable volume 227 adjacent the lower portion of the inner cylinder portion 206, and a third variable volume 229 in a portion of the displacer cylinder which bridges the inner and outer portions. Similarly to the Stirling engine embodiment described with reference to FIG. 1, the variable volume 225 is the expansion volume or first space, and the sum of the variable volumes 215 and 227 is the compression volume of the machine and is termed the second space. The third variable volume or space 229 communicates with an intermediate conduit 231 connected adjacent an intermediate portion 232 of the displacer cylinder bridging the inner and outer portions thereof.

The embodiment 201 has a flow path including a conduit 233 extending from the first space 225, through a heat exchanger 235 to a first end of a thermal regenerator 238 containing an adsorbent bed 239, which cooperate to produce an adsorbent/regenerator combination as before. The flow path also includes a conduit 240 having a heat exchanger 241 in which the conduit 240 communicates an opposite end of the regenerator combination 238 with the variable volume 227 or second space.

An inlet conduit 243 having an inlet valve 245 supplies feed gas to the interior of the thermal regenerator/adsorbent bed. Outlet conduits 248 and 247 provided with outlet valves 250 and 251 respectively communicate with opposite second and first ends 252 and 249 respectively of the regenerator combination.

With the exception of the stepped displacer 208, it can be seen that the structure above described closely resembles the Stirling cycle machine as described with reference to FIG. 1. The embodiment 201 differs mainly by the provision of the third space 229 and the intermediate conduit 231 which communicates with an intermediate combination portion 253 of the regenerator combination 238, 239. The regenerator combination has the intermediate portion 255 disposed between the opposite ends of the regenerator, so that first and second combination portions 255 and 256 extend between the intermediate portion and the first and second ends of the regenerator. In operation, the reciprocating means 221 reciprocates the displacer 208 and power piston 212 to function as volume displacement means so that the displacer 208 leads the piston 212 as before described. This provides cyclical reversals of flow and variations of pressure on the bed. The displacement means communicates also with the third space 229 to produce cyclical reversals in direction of flow of the gas between the third space and the intermediate portion. Due to relative diameters of the portions of the displacer 208, the mass flow in the second portion 256 is greater than that the mass flow in the first portion 255. Because the displacer 208 functions as a single entity, the volume displacements relative to the first and third spaces 225 and 229 are in phase.

For a particular application, the heat exchanger 235 is heated at an elevated temperature $T_1$ and the heat exchanger 241 is at temperature $T_2$ which is ambient. An insulating jacket 259 extends to enclose portions of the flow path adjacent the intermediate conduit 231, the intermediate portion 253 and adjacent portions of the inner and outer cylinder portions 205 and 206. The insulating jacket reduces flow of heat into the apparatus from the outside, and thus enables low temperatures to be attained adjacent the intermediate conduit as follows.

The apparatus has a refrigerator section being the lower flow path including the conduits 231 and 240, the second portion 256 and associated portions of the displacer cylinder. This resembles a conventional Stirling cycle heat pump or refrigerator in which a low temperature is generated at the conduit 231 and heat is transported from the space 229 to the space 227. The upper flow path of the apparatus including the conduits 233 and 231 and associated first egenerator portion 255 and cylinder portions functions as a Stirling engine in which heat to power the engine is applied at the heat exchanger 235. Because there is a greater flow of gas in the lower flow path than the upper flow path, there is a net transport of heat from the space 229 to the heat exchanger 241, providing the refrigeration effect. It can be seen that each portion of the regenerator is subjected to a respective temperature gradient which has a lower temperature adjacent the intermediate portion 253, and higher temperatures exist adjacent outer ends of the regenerator bed.

The portion 256 of the regenerator combination is cooled for selected separation of oxygen and nitrogen under reduced pressures, while rejecting water and carbon dioxide into the outlet conduit 248 which contains nitrogen enriched air. The portion 255 of the regenerator is cooled adjacent the intermediate portion 253 by the adjacent cooler second portion 256 and provides further separation of oxygen towards the hotter end thereof, and nitrogen towards the colder end thereof, while supplying mechanical energy to at least assist in powering the apparatus.

It is noted that both portions of the regenerator contribute to separation of oxygen and nitrogen in a two stage process in which volume displacements at the intermediate regenerator portion 253 are in phase with volume displacements at the first regenerator portion 255. Similarly to the FIG. 1 embodiment, the phase relationship between the pressure and flow reversals is coordinated such that the cyclic gas volume displacements adjacent the first end of the regenerator combination have a leading displacement phase with respect to cyclic gas volume displacements adjacent the second end of the regenerator combination. For certain applications, the insulation is provided adjacent the intermediate portion 253 and related conduits so that temperature adjacent the intermediate regenerator and associated conduits is lowered relative to temperature at both ends of the regenerator.

FIG. 8

A fifth embodiment 266 of the invention is particularly adapted for gas phase reactions in a reaction zone located inside a Stirling cycle machine. Adsorbent material in the regenerator separates at least one product from reactant components of the reaction, so as to maintain the reaction off equilibrium, thus increasing yield or conversion rate of the reaction. In the case of an exothermic reaction, the heat of reaction can be used, at least in part, to drive a Stirling engine. In the case of an endothermic reaction, the heat adsorbed or required by the reaction is transferred from the hotter portion of the apparaatus which operates as a Stirling cycle refrigerator or heat pump.

The fifth embodiment 266 resembles a modified Stirling cycle machine and includes the body, not shown, having a working volume which includes a displacer cylinder 268 having a displacer piston 269, and a power cylinder 271 having a power piston 272. The displacer piston divides the displacer cylinder into variable volumes 274 and 275, and the power piston communicates with a variable volume 277. A conduit 278 interconnects the volumes 275 and 277 and similarly to the previous embodiment, the volume 274 is referred to as the expansion or first space, and the sum of the volumes 275 and 277 is referred to as the compression space or second space. A reciprocating means 281, shown only partly, cooperates with rods 279 and 280 connected to the displacer 269 and the piston 272 respectively to reciprocate the pistons out of phase so that an increase of the expansion volume leads an increase of the compression volume.

A thermal regenerator 282, cooperating with adsorbent material 283 to produce an adsorbent/regenerator combination, has ends 273 and 276 connected to the first and second spaces of the displacer cylinder 268 by conduits 284 and 285 respectively, and heat exchangers 286 and 287 cooperate with the conduits 284 and 285 and are maintained at temperatures $T_1$ and $T_2$ respectively. An inlet conduit 290 has, in sequence from an outer end thereof, a gas purifier 291, a compressor 293, a first non-return inlet valve 295, a heat exchanger 296 within the thermal regenerator and a second non-return valve 298 which cooperates with the conduit 284 which in turn feeds into an adjacent first end of the regenerator 282. If desired, the compressor 293 can be coupled to the reciprocating means 281 through a connection 300, shown in broken outline, so as to drive the compressor, at least in part, with power from the Stirling engine.

The power cylinder 271 is shown in an inverted position to illustrate more clearly the function of product separation in liquid form. A lower portion of the power cylinder 271 acts as a liquid separator 302 and has a liquid discharge valve 304 which is opened periodically to remove liquid product of the reaction. A purge valve 306 positioned above the separator 302 is open periodically to discharge "inert" gases which might otherwise accumulate in the power piston. In applications where the product of the reaction does not liquefy, or purging of inert gases is not a problem, the previously described power cylinder and power piston of FIG. 1 could be substituted for that shown in FIG. 8.

A major feature of the embodiment 266 is the provision of means to permit reaction of two or more gases within the reaction zone of the working volume, and removal of one or more components of the reaction to increase conversion rate. Because the rate of many gas phase chemical reactions is enhanced by use of a catalyst, in most cases it is preferable to provide a catalyst in the reaction zone where the chemical reaction is to take place. For example, if the gas phase reaction is an exothermic reaction, which liberates heat, the catalyst is best provided in the higher temperature portion of the apparatus, for example in the expansion or first space 274 where it is shown as a matrix 308. If the gas phase reaction is endothermic, which absorbs heat, the catalyst would best be provided in a second space 275 of the apparatus, and receives heat transported from the first space. Clearly, separate spaces for the reaction can be provided if necessary, the catalyst adjacent either end of the regenerator, or anywhere in the flow path at an appropriate temperature. The reaction zone is usually associated with a variable volume space which can remove exothermic heat or provide endothermic heat of reaction.

EXAMPLE NO. 6

A particularly useful application of the embodiment 266, using an exothermic reaction, is the synthesis of ammonia from nitrogen and hydrogen over a promoted iron catalyst. In this reaction the regenerator combination 282, 283 contains an adsorbent which preferentially adsorbs ammonia relative to hydrogen and nitrogen, for example a zeolite such as molecular sieve 13X. The feed gases of nitrogen and hydrogen in correct proportions are fed into the inlet conduit 290, purified by the purifier 291 with the exception of minor "inert" gases such as argon and methane, and compressed in the compressor 293 to an operating pressure of about 120 atmospheres. The compressed feed gas is delivered through the inlet valve 295 to the heat exchanger 296 which heats the feed gas to the synthesis temperature $T_1$ of about 450 degrees C. The preheated feed gas is injected into the conduit 284 of the Stirling engine through the non-return valve 298 and passes through the heat exchanger 286 which serves as a start-up heater.

The catalyst in the expansion volume 274 enhances the speed of the reaction so that the product, ammonia gas, is transported by pressure swing adsorption towards the second space or cooler end of the apparatus, that is towards the cooler end of the regenerator, through the conduit 285 where it is condensed in the compression space 275 by removing heat with the heat exchanger 287. Liquid ammonia condenses in the separator 302 from where it is removed during intervals of high pressure through the discharge valve 304. It is added that any liquid ammonia remaining in the separator during intervals of lower pressure would tend to evaporate and thus reduce the amplitude of pressure swings in the systems. Conversely, the presence of some freely mobile liquid ammonia (i.e. droplets in the gas mixture, in the cooler end of the regenerator would tend to increase the amplitude of pressure swings.

The zeolite adsorbent in the regenerator 282 has much higher affinity for ammonia than for hydrogen or nitrogen. However, nitrogen and "inert" gases including argon and methane will be preferentially adsorbed relative to hydrogen. Hydrogen is parametrically pumped into the reaction zone adjacent the hotter end 273. Hence a concentration gradient will be established across the regenerator with the nitrogen and "inerts" more concentrated toward the cold end where the ammonia is also concentrated and liquified. Excessive build up of inerts will be avoided by periodic opening of the purge valve 306, which will vent the nitrogen rich mixture containing accumulated "inerts" from the separator 302.

It is anticipated that cyclic pressure excursions in this Stirling engine apparatus may range from 120 atmospheres to 200 atmospheres. Since average pressure is then 160 atmospheres, while feed gas injection is 120 atmospheres in this case, it can be seen that the engine actually performs the final stage of feed gas compression within its own regime of cyclic pressure.

At this relatively low synthesis loop pressure of 160 atmospheres, a conventional ammonia synthesis plant could not obtain satisfactory condensation of liquid ammonia without auxiliary refrigeration. In this invention, the lower temperature $T_2$ will correspond to normal ambient temperatures, and refrigeration is not required because ammonia is concentrated within the apparatus. It is expected that the pressure swing adsorption function will remove ammonia very rapidly from the expansion volume of the engine, driving the reaction far from equilibrium and thus enhancing catalyst productivity.

In ammonia synthesis, the desired product, i.e., ammonia, is adsorbed and removed from the reaction zone by adsorption followed by liquefying and removal as a liquid. In other reactions, if an undesirable side product is formed in a side reaction, the side reaction can be suppressed by preventing the side product from leaving the reaction zone, thus maintaining the side reaction at equilibrium. An example of this type of reaction is given in Example No. 7. In both cases, the process of the invention is thus characterized by combining a chemical reaction function with the gas separation function adjacent a reaction zone, wherein the gas mixture includes at least one reactant and at least one product of the reaction, one of which is preferentially adsorbed in the adsorbent material.

EXAMPLE NO. 7

The potential for application of the invention to endothermics reactions may be illustrated by the important example of synthesis gas production by steam reforming of methane. The main reaction is $$CH_4 + H_2O \rightleftharpoons CO + 3H_2.$$

In the conventional process, feed methane and steam are passed over a nickel catalyst, at typical conditions of 900° C. and 30 atmospheres. A large excess of steam is necessary to prevent carbon deposition on the catalyst, and to drive the reaction forward. The endothermic heat of reaction is supplied by external heating of the high alloy tubes containing the catalyst. These severely stressed catalyst tubes are very costly. High energy costs are also associated with the temperature drop through the tube walls, and the large excess volume of steam required. Also carbon dioxide is produced as a side product in a side reaction which lowers conversion rate of the desired or main product.

Figure 8:
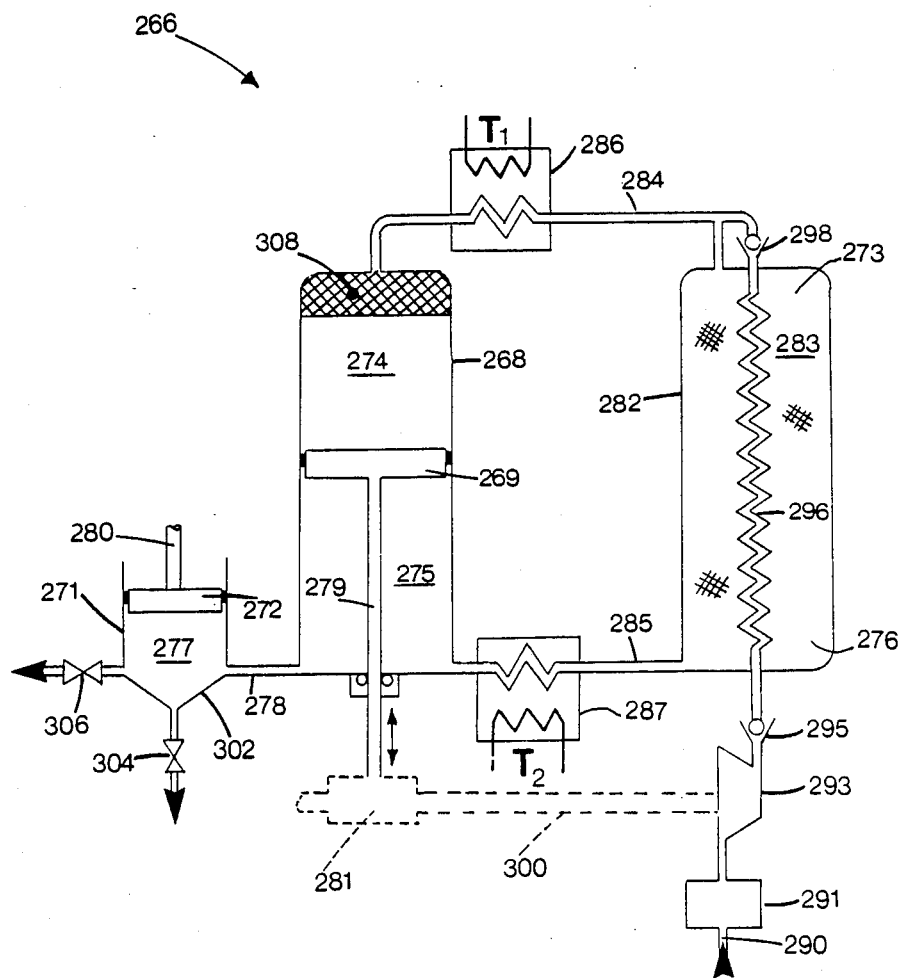
FIG. 8 is a simplified schematic of an improved gas synthesis apparatus based on the invention.

In the present invention applied to steam reforming, a heat pump embodiment of FIG. 8 will be used to transport lower grade heat from an initial temperature $T_1$ of perhaps 300° C. to the reforming temperature $T_2$ of about 900° C. The reaction zone will accordingly be associated with the second space 275 of the Stirling machine. To avoid high temperatures the power piston and drive means can be located in the cooler regime associated with the first space, while maintaining the required phase difference. To increase conversion rate it is desired to concentrate the reactants methane and water into the reaction zone in the space 275, while removing the products carbon monoxide and hydrogen.

The reactants, main products and side products of this reaction can be put in a descending order of adsorption over silica gel or alumina gel adsorbents as follows:
Water
Carbon dioxide
Methane
Carbon monoxide
Hydrogen Hence steam will be concentrated strongly into the second space 275, while hydrogen and carbon monoxide will be separated and transported toward the first space 274. This achieves the desired separation of products from a reagent. Since the side product carbon dioxide is also concentrated into the reaction zone in space 275, this corresponding side reaction will be inhibited. This exemplifies the ability of the invention to achieve reaction selectivity, where the undesired product is trapped in the reaction zone, whereas the desired product is readily removed. A high partial pressure of carbon dioxide over the catalyst will help suppress carbon deposition. Since adsorbent coefficients are reduced at elevated temperatures, the apparatus may be designed to produce some carbon dioxide with the carbon monoxide, as is desirable for subsequent methanol synthesis.

As the endothermic heat is provided to the reaction zone directly by the reacting gases as the Stirling cycle working fluid, the need for heat exchange through highly stressed catalyst tubes is eliminated. The energy burden of excess steam supply above stoichiometric requirements is avoided, and the process may use relatively low grade heat.

It is seen that this more complex reaction is characterized by transporting by parametric pumping the desired product away from the reaction zone to maintain the desired reaction off equilibrium to assist in high conversion to the desired product, and maintaining by parametric pumping the undesired product within the reaction zone to assist in maintaining the undesired reaction near equilibrium, to reduce conversion to the undesired product.

Some important effects will arise in the operation of an off equilibrium catalytic reaction inside a Stirling engine. Unless auxiliary non-return valves or recirculation blowers are used to make the flow over the catalyst unidirectional, the catalyst bed is subjected to a regime of reversing flows and pulsating pressure. It is expected that this regime will be favourable to good mass transfer and heat transfer from the catalyst. Pressure pulsations will generate forced breathing of catalyst pores, with consequently improved mixing.

A more subtle effect will arise from the pressure sensitivity of physical adsorption and hence chemisorption on the catalyst surfaces. Since pressure pulsations will cause reversing flow in catalyst pores and also will in general cause differential adsorption of reactant and product components, parametric pumping effects may be expected within catalyst pores. Such effects may change the reaction kinetics significantly.

If a reactant is more readily or rapidly adsorbed than the products, pressure swing parametric pumping may tend to oppose penetration of that reagent into the catalyst pores, and thus retard the reaction rate. This is a plausible explanation of the results obtained by Baiker for ethylene hydrogeneration. Conversely if a reactant is more slowly adsorbed than the product, the product should be removed more rapidly from the interior of the catalyst by pressure swing parametric pumping, and the penetration of that reactant and the reaction rate should be enhanced. As ammonia and hydrogen are both readily adsorbed on an iron catalyst, while adsorption of nitrogen is lower, the above effect may be beneficial in the case of ammonia synthesis.

The thesis work of Jain showed that the rate of ammonia synthesis can be enhanced by cyclic variations of feed composition. In the present invention, a non-uniform admixture of hydrogen and nitrogegen is obtained in the regenerator combination through pressure swing adsorption. Because nitrogen is much less highly adsorbed than ammonia, the characteristic velocity of nitrogen concentration wave front will be faster than the velocity of ammonia concentration wave front. Hence, the machine can be designed so that at least partial break through of the nitrogen concentration wave front back into the catalyst is obtained. Then feed composition cycling over the catalyst will be obtained to some degree by the changing concentration of nitrogen. It will be evident that feed composition cycling may be further enhanced in this invention by separately timed and/or located injection of the feed components. Beneficial chromatographic effects may then be obtained, particularly if adsorbent with high capacity for ammonia is mixed with the catalyst as proposed by Unger and Rinker. In conventional ammonia synthesis plants, feed composition cycling appears to be impracticable because most of the gas flowing through the synthesis loop is recycled.

It will be apparent that many variations to the embodiment of FIG. 8 are admissable within this invention. For example, the feed gas could be injected directly into the second or cooler end of the regenerator combination 282 without the heat exchanger 296. This might make control of reactant composition over the catalyst more difficult, but would provide the advantage that any trace carbon dioxide, carbon monoxide and water contaminants would be concentrated by parametric pumping into the ammonia and purge gas effluents, providing some protection to the catalyst.

With appropriately selected catalyst, the embodiment of FIG. 8 can be applied directly to methanol synthesis and many other chemical reactions. An important case is Fischer-Tropsch synthesis of hydrocarbons from carbon monoxide and hydrogen reactants, for which the FIG. 8 embodiment can favourably influence selectivity between alternative products according to their relative ability to be adsorbed on the selected adsorbent material. Both exothermic and endothermic reactions may be conducted inside Stirling cycle machines based on this invention with changes as discussed previously.

This invention clearly has a wide range of chemical reaction applications, and can be expressed in all embodiments above and in, many embodiments or combinations not limited to those described above.

I claim:

1. A process for separating components of a gas mixture containing first and second components, the process including the steps of:
   (a) providing a working volume having a flow path for the gas mixture,
   (b) providing in the flow path an adsorbent material within an adsorbent bed and a thermal regenerator to cooperate with the adsorbent bed to produce an adsorbent/regenerator combination,
   (c) providing in the flow path first and second spaces disposed adjacent opposite ends of the adsorbent/regenerator combination, and maintaining the spaces at different temperatures so as to expose the regenerator combination to a thermal gradient,
   (d) introducing the gas mixture into the working volume, the first component of the gas mixture being more readily adsorbed in the adsorbent material then the second component, and cyclically reversing direction of flow of the gas mixture along the flow path, including the adsorbent/regenerator combination and the first and second spaces in series therewith, so that direction of the flow alternates between opposite ends of the flow path,
   (e) cyclically varying the total pressure of the gas mixture between upper and lower pressure limits within the working volume, so as to subject the gas flow to cyclical reversals of pressure, temperature and direction flow, and simultaneously co-ordinating a phase relationship between the cyclic pressure variations and the cyclic flow reversals relative to the adsorbent bed, such that the first component is preferentially adsorbed and immobilized by increased pressure on the adsorbent bed when the gas flows in one direction, and the first component is preferentially desorbed when the pressure is decreased and the flow is reversed,
   (f) removing from adjacent one end of the adsorbent bed a first gas fraction enriched in the first component, and removing from adjacent the opposite end of the adsorbent bed a second gas fraction depleted in the first component, while also achieving conversion between thermal energy and compression energy in the gas mixture.

2. A process as claimed in claim 1 further characterized by:
   (a) generating the cyclic pressure variations and the cyclic flow reversals by first cyclic gas volume displacements associated with the first space and by second cyclic gas volume displacements associated with the second space, such that the first cyclic gas volume displacements have a leading phase angle with respect to the second cyclic gas volume displacements,
   (b) transporting heat from the first space to the second space, in which the first space is at a first temperature and the second space is at a second temperature,
   (c) and removing the first gas fraction enriched in the first component from adjacent a second end of the regenerator combination which is adjacent the second space, and removing the second gas fraction depleted in the first component from adjacent a first end of the regenerator combination which is adjacent the first space.

3. A process as claimed in claim 2 further characterized by:
   (a) in order to generate the cyclical reversals of flow direction and variations of pressure in the working volume, reciprocating first and second volume displacement means to communicate with the first and second spaces respectively at respective first and second amplitudes of reciprocation, in which the ratio of amplitudes of the displacements is approximately equal to the ratio of the higher temperature to the lower temperature when expressed in degrees Kelvin, and the first volume displacement means has a leading phase angle of approximately 90 degrees with respect to the second volume displacement means.

4. A process as claimed in claim 2 further characterized by:
   (a) conducting a chemical reaction in a reaction zone, wherein the gas mixture includes at least one reactant of the reaction, at least one desired product of a desired chemical reaction, and at least one undesired product of a side reaction, one of the products being preferentially adsorbed in the adsorbent material,
   (b) transporting by parametric pumping the desired product away from the reaction zone to assist in maintaining the desired reaction off-equilibrium to assist in high conversion to the desired product,
   (c) trapping by parametric pumping the undesired product within the reaction zone to assist in retarding the undesired reaction near equilibrium, to reduce conversion to the undesired product.

5. A process as claimed in claim 2 further characterized by:
   (a) conducting a chemical reaction in a reaction zone, wherein the gas mixture includes at least one reactant and at least one product of the reaction, one of which is preferentially adsorbed in the adsorbent material,
   (b) separating the reactant and the product by parametric pumping over the adsorbent material to drive the reaction towards high conversion,
   (c) transporting heat relative to the reaction zone to control temperature of the reaction zone.

6. A process as claimed in claim 5 further characterized by:
   (a) liquefying at least one product of the reaction in a cooler space of the apparatus so as to facilitate separation of the product.

7. A process as claimed in claim 5 further characterised by:
   (a) providing a catalyst in the reaction zone to enhance the rate of the reaction.

8. A process as claimed in claim 5 in which:
   (a) the first component of the gas mixture is a product of the reaction,
   (b) the second component of the gas mixture is a reactant of the reaction,
   and the method further includes:
   (c) locating the reaction zone adjacent the first space,
   (d) removing the product from adjacent the second space.

9. A process as claimed in claim 8 in which:
   (a) the chemical reaction is exothermic and generates heat of reaction, which augments heat in the first space to assist in operation as a heat engine.

10. A process as claimed in claim 9 in which:
    (a) the exothermic reaction is related to ammonia synthesis,
    (b) the product and the first component is ammonia,
    (c) the reactants are hydrogen and nitrogen,
    (d) hydrogen is a less readily adsorbed second component.

11. A process as claimed in claim 10 in which:
    (a) the reaction is conducted over a promoted iron catalyst,
    (b) the adsorbent material includes a zeolite such as molecular sieve 13X.

12. A process as claimed in claim 5 in which:
    (a) the first component of the gas mixture is a reactant of the reaction,
    (b) the second component of the gas mixture is a product of the reaction,
    and the method further includes:
    (c) locating the reaction zone adjacent the second space,
    (d) removing the product from adjacent the first space.

13. A process as claimed in claim 12 in which:
    (a) the chemical reaction is endothermic and absorbs heat of reaction, while heat required by the reaction is transported from the first space.

14. A process as claimed in claim 13 in which:
    (a) the endothermic reaction is steam reforming of methane,
    (b) the reactants are methane and steam,
    (c) the products are carbon monoxide and hydrogen,
    (d) the first component is steam,
    (e) and the second component is hydrogen.

15. A process as claimed in claim 14 in which:
    (a) the reaction is conducted in the presence of a nickel catalyst,
    (b) the adsorbent material includes silica gel and/or alumina gel.

16. A process as claimed in claim 1 further characterized by:
    (a) removing the second gas fraction depleted in the preferentially adsorbed component from the working volume at a time when the pressure is approximately at its maximum for the cycle,
    (b) removing the first gas fraction enriched in the more readily adsorbed component when the pressure is approximately at a minimum for the cycle.

17. A process as claimed in claim 1 further characterized by:
    (a) locating the adsorbent bed physically within a chamber containing the thermal regenerator so that the regenerator combination is an integral unit.

18. A process as claimed in claim 1 in which the regenerator combination has first and second ends associated with the first and second spaces respectively, and the process is further characterized by:
    (a) maintaining the first space at a higher temperature than the second space,
    (b) removing the first gas fraction enriched in the more readily adsorbed first component from adjacent the second end of the bed and removing the second gas fraction depleted in the first component from adjacent the first end of the bed, (c) converting some of the heat supplied to the first space to mechanical work or to compression work so as to operate as an engine cycle.

19. A process as claimed in claim 18 relating to air separation in which:
   (a) the adsorbent is a molecular sieve zeolite,
   (b) the first component is nitrogen and the second component is oxygen,
and the method is further characterized by:
   (c) introducing air adjacent the second end of the regenerator combination,
   (d) removing from the second space the first gas fraction enriched in nitrogen,
   (e) removing from the first space the second gas fraction enriched in oxygen.

20. A process as claimed in claim 1 in which the regenerator combination has first and second ends associated with the first and second spaces respectively, and the process is further characterized by:
   (a) maintaining the second space at a higher temperature than the first space,
   (b) removing from adjacent the second end of the combination the first gas fraction enriched in the more readily adsorbed first component, and removing from adjacent the first end of the combination the second gas fraction depleted in the first component,
   (c) conveying heat from the first space to the second space so as to operate as a heat pump cycle or a refrigeration cycle.

21. A process as claimed in claim 20 further characterized by:
   (a) insulating the first space, the first end of the regenerator combination and a portion of the flow path extending between the first space and the first end to permit attainment of low temperatures in the first end of the combination to facilitate gas separation.

22. A process as claimed in claim 1 further characterized by:
   (a) coordinating the phase relationship between the pressure and flow reversals to generate first cyclic gas volume displacements adjacent a first end of the regenerator combination which have a leading displacement phase angle of 180° with respect to second cyclic gas volume displacements generated adjacent the opposite second end of the regenerator combination and maintaining the working volume substantially constant,
   (b) converting a portion of the heat supplied to the relatively hot space to compression work by delivering at least one separated gas fraction at an elevated pressure relative to the pressure at which the gas mixture is introduced into the process, so as to operate as a thermo-compressor cycle.

23. A process as claimed in claim 1 further characterized by:
   (a) in a first portion of the flow path, coordinating the phase relationship between the pressure and flow reversals to generate first cyclic gas volume displacements adjacent a first end of the regenerator combination which have a leading displacement phase angle of 180° with respect to second cyclic gas volume displacements generated adjacent the opposite second end of the combination, and maintaining the working volume of the first portion substantially constant,
   (b) in a second portion of the flow path, providing a second thermal regenerator, and generating within the second portion of the flow path a cyclically reversing direction of flow so that the direction of flow alternates between opposite ends of the second flow path, and subjecting the second generator to a thermal gradient so as to cyclically vary pressure of the gas between upper and lower pressure limits, so that a second phase relationship exists in the second portion wherein first cyclic gas volume displacements generated adjacent a first end of the second regenerator have a leading displacement phase angle of 180° with respect to second cyclic gas volume displacements generated adjacent the opposite second end of the second regenerator, and maintaining the second working volume to be substantially constant,
   (c) communicating the first and second portions of the apparatus to attain a desired phase relationship between the flow direction reversals and pressure variations of the first and second portions of the apparatus, so as to provide greater flexibility and pressure differences for use as a thermo-compressor.

24. A process as claimed in claim 23 further characterized by:
   (a) providing in the second portion of the flow path reversals of larger volumes of gas than in the first portion of the flow path, so that pressure variations from the second portion will dominate the first portion.

25. A process as claimed in claim 23 further characterized by:
   (a) providing in the regenerator combination of the first portion and in the thermal regenerator of the second portion essentially equal thermal gradients having essentially equal upper temperatures and essentially equal lower temperatures, in which the first space of each portion is exposed to the upper temperature, so as to operate as a thermo compressor with enhanced phase relationship.

26. A process as claimed in claim 23 further characterized by:
   (a) in the first portion of the flow path, providing a thermal gradient for the regenerator combination between upper and lower temperatures, wherein the first space is exposed to the lower temperature,
   (b) in the second portion of the apparatus, providing in the second regenerator a second thermal gradient in which the first space is exposed to a third temperature which is higher than the upper temperature of the first portion, so as to operate also as a Vuilleumier refrigerator or heat pump, so as to obtain gas separations at low temperatures.

27. A process as claimed in claim 1 further characterized by:
   (a) providing communication with the regenerator combination at an intermediate combination portion between opposite first and second ends of the regenerator combination so that first and second combination portions extend between the intermediate portion and first and second ends of the regenerator combination respectively,
   (b) cyclically reversing direction of flow at the intermediate combination portion so as to cyclically vary flow through the first and second combination portions.

28. A process as claimed in claim 27 further characterized by:
  (a) maintaining the cyclical reversals of flow at the intermediate combination portion in phase with the cyclical reversals of flow relative to the first end of the regenerator combination,
  (b) cyclically reversing the directions of flow at the intermediate portion so that more gas circulates through the second combination portion than through the first combination portion, so that flow of heat relative to the intermediate combination portion and the first and second combination portions result in a net gain or loss of heat at the intermediate portion.

29. A process as claimed in claim 28 further characterized by:
  (a) coordinating the phase relationship between the cyclic flow reversals such that cyclic gas volume displacements adjacent the first end of the regenerator combination have a leading displacement phase angle with respect to cyclic gas volume displacements adjacent the second end of the regenerator combination,
  (b) providing insulation adjacent the intermediate portion and related conduits so that temperature adjacent to the intermediate portion and associated conduits is lower than temperatures at both ends of the regenerator combination.

30. A process as claimed in claim 1 further characterized by:
  (a) transferring heat between portions of the regenerator combination and the gas flow relative to either the inlet means or the outlet means.

31. A process of operating a modified Stirling cycle machine wherein an internal working volume containing a gas has a flow path containing first and second spaces and a thermal regenerator disposed between the spaces, the first and second spaces being at different temperatures to expose the regenerator to a thermal gradient, the process also including cyclically reversing direction of flow of the gas along the flow path so that direction of flow alternates between opposite ends of the flow path, and cyclically varying pressure of the gas between upper and lower pressure limits within the working volume so that a phase relationship exists between the cyclic pressure variations and cyclic flow reversals relative to the thermal regenerator, the process being characterized by:
  (a) providing between the spaces an adsorbent bed containing adsorbent material to cooperate with the thermal regenerator to produce an adsorbent/regenerator combination,
  (b) introducing into the working volume a gas mixture containing a first component which is more readily adsorbed by the adsorbent material, and a second component which is less readily adsorbed by the adsorbent material,
  (c) simultaneously when coordinating the phase relationship between the cyclic pressure variations and the cyclic flow reversals relative to the regenerator combination, preferentially adsorbing and immobilising the first component on the combination bed by increased pressure when the gas flows in one direction, and preferentially desorbing the first component by decreasing the pressure when the flow direction is reversed,
  (d) removing from one end of the regenerator combination, a first gas fraction enriched in the first component, and removing from the opposite end of the regenerator combination a second gas fraction depleted in the first component,
  (e) achieving conversion between thermal energy and compression energy in the gas mixture.

32. An apparatus for separating first and second gas components from a gas mixture, the apparatus including:
  (a) a body having an internal working volume having first and second spaces, and a flow path interconnecting the first and second spaces,
  (b) an adsorbent bed and a thermal regenerator provided in the flow path, the bed containing an adsorbent material which is selectively more adsorbent of the first component than the second component, the thermal regenerator cooperating with the adsorbent bed to produce an adsorbent/regenerator combination to receive gas flow which passes along the flow path,
  (c) means to maintain the first and second spaces at different temperatures so as to expose the regenerator combination to a thermal gradient,
  (d) inlet means to admit the gas mixture into working volume, and outlet means to discharge gas from adjacent opposite ends of the adsorbent bed,
  (e) volume displacement means associated with the first and second spaces, and reciprocating means cooperating with the volume displacement means so as to reciprocate the volume displacement means within the body to produce cyclic variations in total pressure and cyclic reversals in direction of flow of the gas past the adsorbent bed, the reciprocating means determining a phase relationship between the cyclic variations of pressure in the gas and directions of flow of the gas,
so that the gas flow along the flow path is subjected to cyclical reversals of temperature combined with cyclical reversals of pressure and direction of flow so that flow of a first gas fraction under reduced pressure past the adsorbent bed towards one space is enriched in the first more readily adsorbed component, while reverse flow of a second gas fraction under increased pressure past the adsorbent bed towards the opposite space is depleted in the first more readily adsorbed component.

33. An apparatus as claimed in claim 32 further characterized by:
  (a) means to conduct a chemical reaction within a reaction zone in the working volume, in which the gas mixture includes at least one reactant and at least one product of the chemical reaction.

34. An apparatus as claimed in claim 33 further including:
  (a) a catalyst means for enhancing the rate of the reaction located in the reaction zone.

35. An apparatus as claimed in claim 33 further characterized by:
  (a) condenser means cooperating with the second space of the apparatus so as to liquefy at least one product of the reaction, so as to facilitate separation of the product.

36. An apparatus as claimed in claim 33 in which:
  (a) the first component of the gas mixture is a product of the reaction,
  (b) the second component of the gas mixture is a reactant of the reaction,
  (c) the reaction zone is located adjacent the first space, (d) the outlet means is located adjacent the second space.

37. An apparatus as claimed in claim 36 in which:
(a) means for conducting an exothermic reaction is located adjacent the first space of the working volume to supply heat to the first space, so as to convert a portion of the reaction heat to mechanical energy,
(b) the regenerator combination has means for adsorbing more readily at least one of the products so as to separate at least a portion of the product from the gas mixture to drive the reaction off equilibrium and achieve high conversion.

38. An apparatus as claimed in claim 33 in which:
(a) the first component of the gas mixture is a reactant of the reaction,
(b) the second component of the gas mixture is a product of the reaction,
(c) the reaction zone is located adjacent the second space,
(d) the outlet means is located adjacent the first space.

39. An apparatus as claimed in claim 38 in which:
(a) means for conducting an endothermic reaction is located in the second space so that heat required by the reaction is transported from the first space to the second space by heat pump action,
(b) the generator combination having means for adsorbing more readily a reactant so as to separate the reactant from the gas mixture to drive the reaction off equilibrium and achieve high conversion.

40. An apparatus as claimed in claim 32 further characterized by:
(a) the adsorbent/regenerator combination having an intermediate combination portion disposed between opposite first and second ends of the regenerator combination so that first and second combination portions extend between the intermediate combination portion and the first and second ends of the regenerator combination respectively,
(b) the working volume has a third space communicating with the intermediate portion, through an intermediate conduit and the volume displacement means cooperate with the third space to produce cyclic reversals in direction of flow of the gas between the third space and the intermediate portion.

41. An apparatus as claimed in claim 40 further characterized by:
(a) the reciprocating means cooperating with the volume displacement means so as to maintain the cyclical reversals of flow between the third space and the intermediate combination portion in phase with the cyclical reversals of flow between the first space and the first combination portion,
(b) the volume displacement means cooperating with the first second and third spaces so that flow of gas through the second combination portion is greater than that through the first combination portion.

42. An apparatus as claimed in claim 41 further characterized by:
(a) the reciprocating means cooperating with the volume displacement means so that cyclic gas volume displacements adjacent the first end of the regenerator combination have a leading displacement phase angle with respect to cyclic gas volume displacements adjacent the second end of the regenerator combination,
(b) insulation means adjacent the intermediate portion and the intermediate conduit, so that temperature adjacent the intermediate portion and the intermediate conduit is lowered relative to temperature at both ends of the regenerator combination.

43. An apparatus as claimed in claim 32 further characterized by:
(a) the volume displacement means including first and second volume displacement means which are adapted to reciprocate at the same frequency, and at respective amplitudes of reciprocation with the displacement phase angle being approximately 90 degrees, the first and second displacement means communicating with the first and second spaces respectively,
(b) means to control a ratio of the amplitudes of the displacement of the first and second displacement means so as to equal approximately a ratio of the higher temperature to the lower temperature of the spaces, when expressed in degrees Kelvin.

44. An apparatus as claimed in claim 32 further characterized by:
(a) the regenerator combination having a chamber containing the adsorbent material integral with the thermal regenerator.

45. An apparatus as claimed in claim 32 further characterized by:
(a) the volume displacement means having first and second volume displacement means which communicate with the first and second spaces respectively,
(b) the reciprocating means cooperating with the first and second volume displacement means so that the displacement means reciprocate at the same frequency, and the volume of gas displaced by the first volume displacement means leads the volume of the gas displaced by the second volume displacement means by a phase angle of between zero degrees and 180 degrees, 46. An apparatus as claimed in claim 32 further characterized by:
(a) control means adapted to cooperate with the outlet means so that the second gas fraction depleted in the more readily adsorbed component is removed from adjacent the first space at a time when the pressure is approximately at its maximum for the cycle, and the first gas fraction enriched in the more readily adsorbed component is removed from adjacent the second space when the pressure is approximately at a minimum for the cycle.

47. An apparatus as claimed in claim 32 further characterized by:
(a) auxiliary heat exchangers provided in the regenerator combination and adapted to transfer heat between portions of the regenerator combination and gas flow relative to either the inlet valve means or the outlet valve means.

48. An apparatus as claimed in claim 32 further characterized by:
(a) the reciprocating means cooperating with the volume displacement means so that heat is pumped from the first space to the second space,
(b) thermal insulation means cooperating with the first space to enable reduction of the temperature of the first space to permit gas separation at reduced temperature.

49. An apparatus as claimed in claim 32 further characterized by:

(a) means to maintan the temperature of the first space higher than the temperature of the second space, (b) work conversion means cooperating with the first and second spaces to convert in part heat at the higher temperature to mechanical work or compression so as to operate also as an engine.

50. The apparatus as claimed in claim 32 further characterized by:
   (a) the volume displacement means being a double-acting displacer means, so that phase angle between first and second gas volume displacements is 180 degrees,
   (b) a displacer cylinder cooperates with opposite ends of the combination regenerator with the double-acting displacer means, so that the double-acting displacer means separates the first and second spaces,
   (c) the temperature of the first space is higher than temperature of the second space so as to operate as a thermo-compressor.

51. An apparatus as claimed in claim 50 further characterized by:
   (a) the thermal gradient of the regenerator combination being defined by first and second temperatures associated with the first and second spaces respectively, the regenerator combination and the said displacer cylinder being a first portion of the flow path,
   (b) a second portion of the flow path having a second double-acting displacer means and a second displacer cylinder, the second double-acting displacer means being reciprocable within the second displacer cylinder,
   (c) a second thermal regenerator cooperating with opposite ends of the second displacer cylinder, and being exposed to a second thermal gradient defined by the second temperature and a third temperature, in which the third temperature substantially equals the first temperature,
   (d) conduit means interconnecting the first and second portions of the flow path, and the first and second double-acting displacer means cooperating with the reciprocating means to operate at a phase angle which coordinates cyclic variations of pressure and reversals of gas flow past the regenerator combination to improve separation of the components.

52. An apparatus as claimed in claim 51 further characterized by:
   (a) the second double-acting displacer means having a greater displacement than the first double-acting displacer means so as to dominate gas flow and pressure variations within the working volume.

53. An apparatus as claimed in claim 50 further characterized by:
   (a) the thermal gradient of the regenerator combination being defined by first and second temperatures associated with the first and second spaces respectively, the second temperature being near ambient,
   (b) a second portion of the flow path having a second double-actng displacer means, and a second displacer cylinder, the second doubleacting displacer means being reciprocable within the second displacer cylinder,
   (c) a second thermal regenerator communicating with opposite ends of the second displacer cylinder and being exposed to a second thermal gradient defined by the second temperature and a third temperature, in which the third temperature is elevated above ambient,
   (d) means to supply heat to the apparatus at the third temperature so as to drive the displacer and reciprocating means in such a manner as to obtain both gas separation and refrigeration functions.

54. An apparatus which resembles a modified Stirling cycle machine and is for separating a gas which is a mixture of at least first and second components, the apparatus including:
   (a) a body having an internal working volume having first and second spaces,
   (b) a flow path for gas interconnecting the first and second spaces,
   (c) a thermal regenerator and an adsorbent bed provided in the flow path between the first and second spaces, the adsorbent bed containing adsorbent material which cooperates with the thermal regenerator to produce an adsorbent/regenerator combination disposed between the first and second spaces, the adsorbent material having means for absorbing more readily the first component than the second component of the gas mixture,
   (d) means to maintain the first and second spaces at different temperatures so as to expose the adsorbent/regenerator combination to a thermal gradient,
   (e) first and second volume displacement means communicating with the first and second spaces respectively,
   (f) reciprocating means cooperating with the first and second volume displacement means so that the first and second volume displacement means reciprocate at the same frequency to produce cyclic variations in total pressure and in direction of flow of the gas, the reciprocating means determining phase angle between cyclic variations of pressure in the gas and flow direction of the gas over the adsorbent/regenerator combination, so as to subject the gas flow to cyclical reversals of pressure and direction flow, so that flow under decreased pressure of the first gas fraction past the regenerator combination towards one space is enriched in the first more readily adsorbed component, and flow under increased pressure of a second gas fraction past the regenerator combination towards the remaining space is depleted in the first more readily adsorbed component,
   (g) inlet means for admitting the gas mixture into the working volume,
   (h) outlet means for discharging gas fractions from opposite ends of the regenerator combination.

* * * * *